US011677133B2

(12) United States Patent
Harvey et al.

(10) Patent No.: US 11,677,133 B2
(45) Date of Patent: Jun. 13, 2023

(54) DEPLOYABLE STRUCTURE FOR USE IN ESTABLISHING A REFLECTARRAY ANTENNA

(71) Applicant: M.M.A. Design, LLC, Louisville, CO (US)

(72) Inventors: Thomas J. Harvey, Nederland, CO (US); Toby J. Harvey, Cedar City, UT (US); Mitchell T. Wiens, Loveland, CO (US); Mark A. Bailey, Longmont, CO (US); Shane E. Stamm, Lyons, CO (US); Christopher A. Pelzmann, Longmont, CO (US)

(73) Assignee: M.M.A. Design, LLC, Louisville, CO (US)

( * ) Notice: Subject to any disclaimer, the term of this patent is extended or adjusted under 35 U.S.C. 154(b) by 116 days.

(21) Appl. No.: 17/170,353

(22) Filed: Feb. 8, 2021

(65) Prior Publication Data
US 2021/0184331 A1    Jun. 17, 2021

Related U.S. Application Data

(63) Continuation of application No. 16/295,615, filed on Mar. 7, 2019, now Pat. No. 10,971,793, which is a
(Continued)

(51) Int. Cl.
*H01Q 1/08* (2006.01)
*H01Q 1/28* (2006.01)
(Continued)

(52) U.S. Cl.
CPC .............. *H01Q 1/08* (2013.01); *B64G 1/222* (2013.01); *B64G 1/66* (2013.01); *H01Q 1/28* (2013.01);
(Continued)

(58) Field of Classification Search
CPC ........ H01Q 15/161; B64G 1/66; B64G 1/222; B64G 1/1021
See application file for complete search history.

(56) References Cited

U.S. PATENT DOCUMENTS 3,010,372 A    11/1961  Lanford
3,710,806 A    1/1973   Kelly
(Continued)

FOREIGN PATENT DOCUMENTS

| GB | 2330007 | 1/2002 |
|---|---|---|
| JP | 2008308940 | 12/2008 |
| WO | 03003517 | 1/2003 |

OTHER PUBLICATIONS

De Boer, GaAs Mixed Signal Multi-Function X-Band Mmic with 7 Bit Phase and Amplitude Control and Integrated Serial to Parallel Converter, TNO Physics and Electronics Laboratory.
(Continued)

*Primary Examiner* — Ricardo I Magallanes
(74) *Attorney, Agent, or Firm* — Holzer Patel Drennan

(57) ABSTRACT

A deployable structure for use in establishing a reflectarray antenna is provided that includes a flexible reflectarray and a deployment structure that includes an endless pantograph for deploying the flexible reflectarray from a folded, undeployed state towards a deployed state in which the flexible reflectarray is substantially planar. In a particular embodiment, the deployment structure includes a plurality of tapes that engage the endless pantograph and are used to establish a positional relationship between the deployed reflectarray and another component of the reflectarray antenna.

23 Claims, 17 Drawing Sheets

Related U.S. Application Data continuation of application No. 15/276,725, filed on Sep. 26, 2016, now Pat. No. 10,283,835.

(60) Provisional application No. 62/233,115, filed on Sep. 25, 2015.

(51) Int. Cl.
  H01Q 3/46 (2006.01)
  B64G 1/22 (2006.01)
  H01Q 15/16 (2006.01)
  B64G 1/66 (2006.01)
  H01Q 15/14 (2006.01)
  H01Q 1/12 (2006.01)

(52) U.S. Cl.
  CPC ............... H01Q 1/288 (2013.01); H01Q 3/46 (2013.01); H01Q 15/161 (2013.01); *H01Q 1/1235* (2013.01); *H01Q 15/14* (2013.01)

(56) References Cited

U.S. PATENT DOCUMENTS

| | | | |
|---|---|---|---|
| 4,380,013 A | 4/1983 | Slysh | |
| 4,419,828 A | 12/1983 | Farris | |
| 4,557,083 A | 12/1985 | Zanardo | |
| 5,218,375 A | 6/1993 | Hillman | |
| 5,680,145 A | 10/1997 | Thomson | |
| 5,864,324 A * | 1/1999 | Acker | H01Q 15/161 343/915 |
| 6,035,877 A | 3/2000 | Losi | |
| 6,104,358 A | 8/2000 | Parker | |
| 6,175,341 B1 | 1/2001 | Noir | |
| 6,240,940 B1 | 6/2001 | Carter | |
| 6,323,827 B1 * | 11/2001 | Gilger | H01Q 1/08 343/915 |
| 6,419,175 B1 | 7/2002 | Rankin | |
| 7,044,146 B2 | 5/2006 | Losi | |
| 7,530,364 B2 | 5/2009 | Carter | |
| 7,624,747 B2 | 12/2009 | Carter | |
| 7,762,500 B1 | 7/2010 | Dhall | |
| 7,856,735 B2 | 12/2010 | Allezy | |
| 8,905,357 B1 | 12/2014 | Harvey | |
| 9,169,634 B2 | 10/2015 | Guerrero | |
| 2010/0031525 A1 * | 2/2010 | Allezy | B32B 27/304 33/771 |
| 2011/0253827 A1 | 10/2011 | Wantanbe | |
| 2014/0263844 A1 * | 9/2014 | Cook, Jr. | H02S 30/20 343/705 |
| 2015/0060605 A1 | 3/2015 | Tserodze | |
| 2016/0197394 A1 | 7/2016 | Harvey et al. | |

OTHER PUBLICATIONS

Grafmuller, et al., "The TerraSAR-X Antenna System", 2005 IEEE.
Gatti et al., Computation of Gain, Noise Figure, and Third-Order Intercept of Active Array Antennas. IEEE Transactions on Antennas and Propagation, vol. 52, No. 11, Nov. 2004.
Moreira, TerraSAR-X Upgrade to a Fully Polarimetric Imaging Mode. German Aerospace Center (DLR), Jan. 16, 2003.
Smith et al., Coplanar Waveguide Feed for Microstrip Patch Antennas. Electronics Letters, vol. 28, No. 25. Dec. 3, 1992.
Gatti et al., A Novel Phase-Only Method for Shaped Beam Synthesis and Adaptive Nulling. University of Perugia, Dept. Electronic and Information Engineering.
Mencagli et al., Design of Large MM-Wave Beam-Scanning Reflectarrays. University of Perugia, Dept. Electronic and Information Engineering.
Sorrentino et al., Beam Steering Reflectarrays. University of Perugia.
Kim et al., Spaceborne SAR Antennas for Earth Science.
Marcaccioli et al., Beam Steering MEMS mm-Wave Reflectarrays. University of Perugia, Dept. of Information and Electronic Engineering.
Sorrentino et al., Electronic Reconfigurable MEMS Antennas. University of Perugia, Dept. of Electronic and Information Engineering.
Bachmann et al., TerraSAR-X In-Orbit Antenna Model Verification Results. German Aerospace Center (DLR).
Bialkowski et al., Bandwidth Considerations for a Microstrip Reflectarray. Progress In Electromagnetics Research B, vol. 3, 173-187, 2008.
Mikulas et al., Tension Aligned Deployable Structures for Large 1-D and 2-D Array Applications. 49th AIAA/ASME/ASCE/AHS/ASC Structures, Structural Dynamics and Materials Conference, Apr. 7-10, 2008.
Freeman et al., On the Use of Small Antennas for SAR and SAR Scatterometer Systems.
Gatti et al., Scattering Matrix Approach to the Design of Infinite Planar Reflectarray Antennas. DIEI, University of Perugia.
Ebadi et al., Linear Reflectarray Antenna Design Using 1-bit Digital Phase Shifters. D.I.E.I. University of Perugia.
Ebadi et al., Near Field Focusing in Large Reflectarray Antennas Using 1-bit Digital Phase Shifters. DIEI, University of Perugia.
Sorrentino et al., Recent Advances on Millimetre Wave Reconfigurable Reflectarrays. DIEI, University of Perugia.
Chen et al., Fully Printed Phased-Array Antenna for Space Communications.
Gatti et al., Millimetre Wave Reconfigurable Reflectarrays. RF Microtech, a spin-off of the University of Perugia, c/o DIEI.
Montori et al., Constant-Phase Dual Polarization MEMS-Based Elementary Cell for Electronic Steerable Reflectarrays. University of Perugia, Dept. of Electronic and Information Engineering.
Marcaccioli et al., RF MEMS-Reconfigurable Architectures for Very Large Reflectarray Antennas. Dept. of Electronic and Information Engineering, University of Perugia.
Carrasco et al., Dual-polarization reflectarray elements for Ku-band Tx/Rx portable terminal antenna. RF Microtech.
Mencagli et al., Design and Realization of a MEMS Tuneable Reflectarray for mm-wave Imaging Application. University of Perugia, DIEI.
Younis, et al., A Concept for a High Performance Reflector-Based X-Band SAR. German Aerospace Center (DLR), Microwaves and Radar Institute.
Montori et al., Design and Measurements of a 1-bit Reconfigurable Elementary Cell for Large Electronic Steerable Reflectarrays. Dept. of Electronic and Information Engineering.
Montori et al., 1-bit RF-MEMS-Reconfigurable Elementary Cell for Very Large Reflectarray. Dept. of Electronic and Information Engineering.
Moussessian et al., An Active Membrane Phased Array Radar. Jet Propulsion Laboratory, California Institute of Technology.
Fisher, Phased Array Feeds For Low Noise Reflector Antennas. Electronics Division Internal Report No. 307, Sep. 24, 1996.
Montori et al., Wideband Dual-Polarization Reconfigurable Elementary Cell for Electronic Steerable Reflectarray at Ku-Band. University of Perugia, Dept. of Electronic and Information Engineering.
Gannudi et al., Preliminary Design of Foldable Reconfigurable Reflectarray for Ku-Band Satellit4e Communication. University of Perugia, Dept. of Electronic and Information Engineering.
Tienda, et al., Dual-Reflectarray Antenna for Bidirectional Satellite Links in Ku-Band. European Conference on Antennas and Propagation, Apr. 11-15, 2011.
Lane et al., Overview of the Innovative Space-Based Radar Antenna Technology Program. Journal of Spacecraft and Rockets. vol. 48, No. 1 Jan.-Feb. 2011.
Devireddy et al., Gain and Bandwidth Limitations of Reflectarrays. Dept. of Eletrical Engineering. ACES Journal, vol. 26, No. 2. Feb. 2011.
Knapp et al., Phase-Tilt Radar Antenna Array. Dept. of Electrical and Computer Engineering, University of Massachusetts.
Moussessian et al., Large Aperture, Scanning, L-Band SAR (Membrane-based Phased Array). 2011 Earth Science Technology Forum.
Arista et al., Reskue Project: Transportable Reflectarray Antenna For Satellite Ku-Band Emergency Communications.
DuPont Kapton, Polyimide Film. General Specifications.

(56) References Cited

OTHER PUBLICATIONS

Footdale et al., Static Shape and Modal Testing of a Deployable Tensioned Phased Array Antenna. 53rd AIAA/ASME/ASCE/AHS/ASC Structures, Structural Dynamics and Materials Conference. Apr. 23-26, 2012.
Montori et al., Reconfigurable and Dual-Polarization Folded Reflectarray Antenna. Dept. of Electronic and Information Engineering. University of Perugia.
Zebrowski, Illumination and Spillover Efficiency Calculations for Rectangular Reflectarray Antennas. High Frequency Electronics.
Jeon et al., Structural Determinancy and Design Implications for Tensioned Precision Deployable Structures. 54th AIAA/ASME/ASCE/AHS/ASC Structures, Structural Dynamics, and Materials Conference. Apr. 8-11, 2013.
Bachmann et al., TerraSAR-X Antenna Calibration and Monitoring Based on a Precise Antenna Model.
Hum et al., Reconfigurable Reflectarrays and Array Lenses for Dynamic Antenna Beam Control: A Review. IEEE Transactions on Antennas and Propagation. Aug. 21, 2013.
Hodges et al., ISARA Integrated Solar Array Reflectarray Mission Overview. Jet Propulsion Laboratory. California nstitute of Technology. Aug. 10, 2013.
Cooley, Michael "Phased Array-Fed Reflector (PAFR) Antenna Architectures for Space-Based Sensors." Northtrop Grumman Electronic Systems 2015.
FedBizOpps, Cubesat Solar Sail Systems—ManTech/Nexolve. Oct. 25, 2013.
Metzler, Thomas "Design and Analysis of a Microstrip Reflectarray". University of Massachusetts. 1993.
Synak, Aleksander "Erasmus Student Exchange Project: Design and Implementation of UHF Patch Antenna." Universitat Politecnica De Catalunya.
Pehrson et al., Folding Approaches for Tensioned Precision Planar Shell Structures. AIAA SciTech Fourm. 2018 AIAA Spacecraft Structures Conference. Jan. 8-12, 2018.
Greschik et al., Error Control via Tension for an Array of Flexible Square Antenna Panels. 51st AIAA/ASME/ASCE/AHS/ASC Structures, Structural Dynamics, and Materials Conference. Apr. 12-16, 2010.
Greschik et al., Strip Antenna Figure Errors Due to Support Truss Member Length Imperfections. 45th AIAA/ASME/ASCE/AHS/ASC Structures, Structural Dynamics and Materials Conference. Apr. 19-22, 2004.
Gatti et al., Low Cost Active Scanning Antenna for Mobile Satellite Terminals, University of Perugia, Dept. Electronic and Information Engineering. Jul. 2003.
Rahmat-Samii, Ka Band Highly Constrained Deployable Antenna for RaInCube, Jun. 2017.
Murphy, Tyler et al., PEZ: Expanding CubeSat Capabilities through Innovative Mechanism Design, 25th Annual AIAA/JSU Conference on Small Satellites. 2011.
Khayatian, Behrouz et al. "Radiation Characteristics of Reflectarray Antennas: Methodology and Applicatios to Dual Tonfigurations", Jet Propulsion Laboratory. Nov. 2006.
Fang, Houfei Thermal Distortion Analyses of a Three-Meter Inflatable Reflectarray Antenna, Jet Propulsion Laboratory. 2003.
Jones, P. Alan, et al. "Spacecraft Solar Array Technology Trends", AEC—Able Engineering Company, Inc. Mar. 1998.
Mierheim, Olaf, et al. "The Tape Spring Hinge Deployment System of the EU: Cropis Solar Panels", German Aerospace Center DLR. May 2018.
Huang, John, Capabilities of Print cd Reflectarray Antennas, Jet Propulsion Laboratory, California Institute of Technology. 2007.
Huang, John, Review and Design of Printed Reflectarray Antennas, Jet Propulsion Laboratory, California Institute of Technology. 2005.
Zawadzki, Mark et al., Integrated RF Antenna and Solar Array for Spacecraft Application, Jet Propulsion Laboratory, California Institute of Technology. Aug. 2013.
Dearborn et al., A Deployable Membrane Telescope Payload for CubeSats, JoSS, 2014, vol. 3, No. 1., pp. 253-264. 2014.
Gatti, Roberto "Pubblicazioni Reflectarrays" Retrieved 2019.
"Office Action and Search Report Issued in Canada Patent Application No. 2,999,987", dated Nov. 17, 2022, 8 Pages.

\* cited by examiner

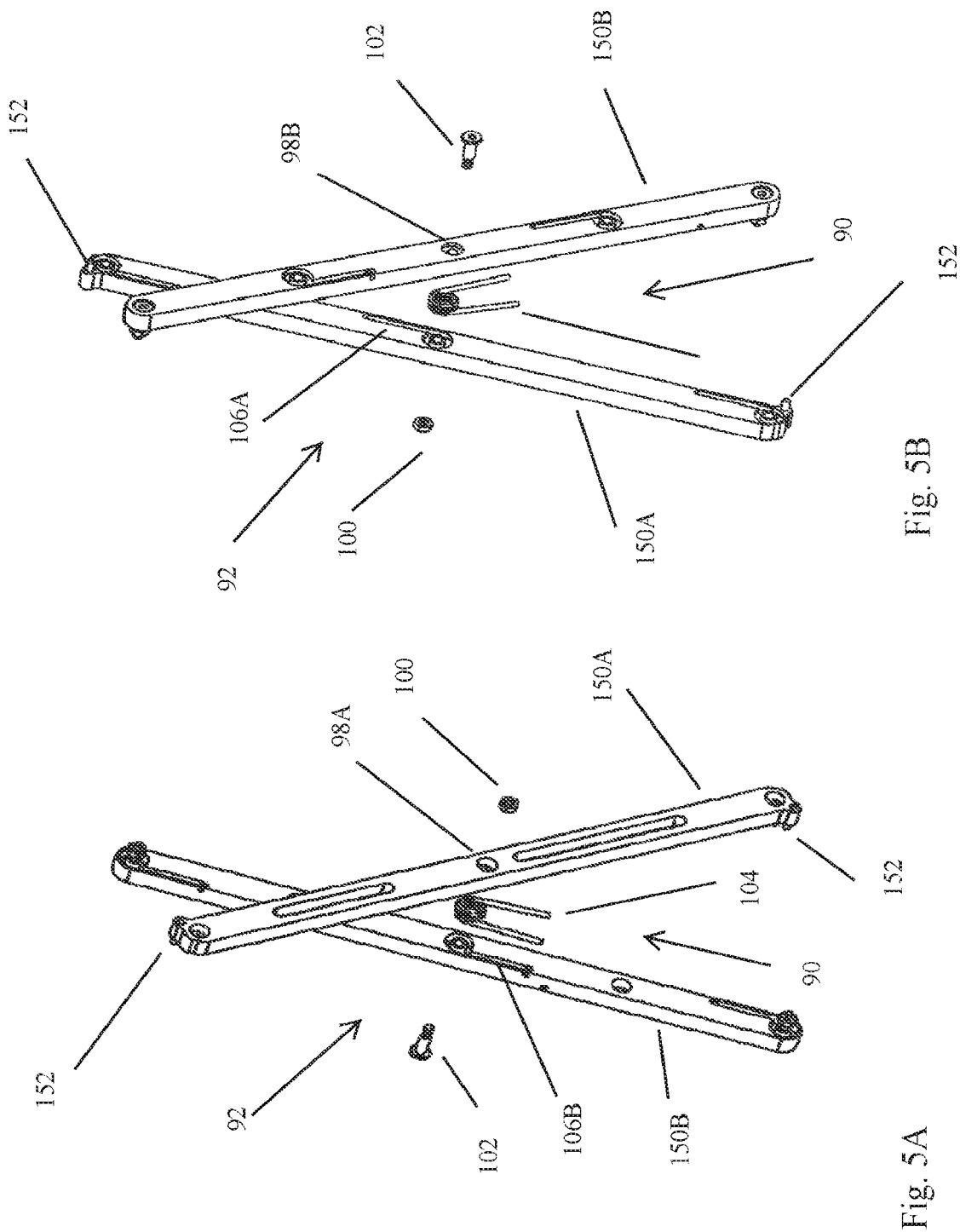

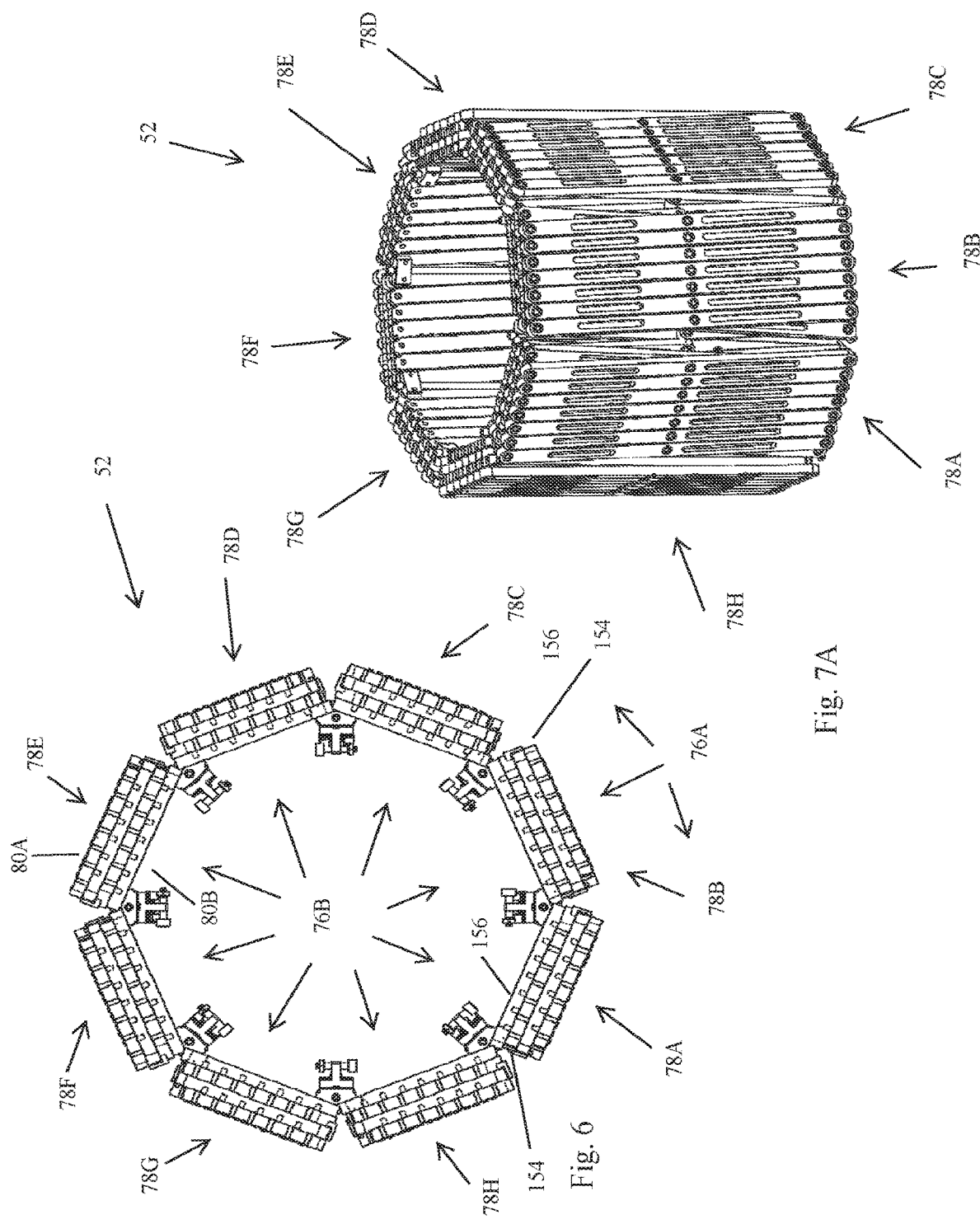

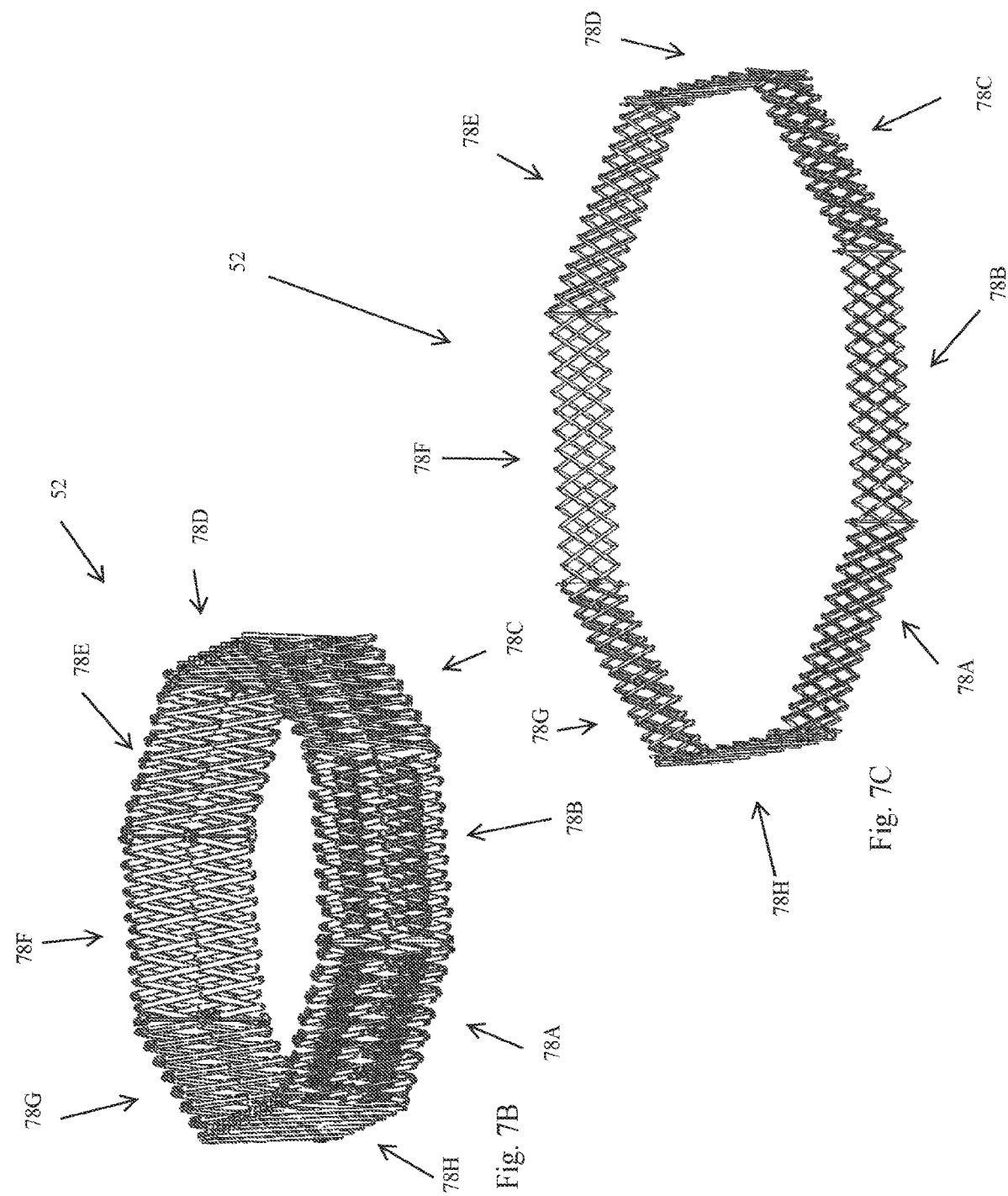

DEPLOYABLE STRUCTURE FOR USE IN ESTABLISHING A REFLECTARRAY ANTENNA

CROSS-REFERENCE TO RELATED APPLICATIONS

This application is a continuation of U.S. application Ser. No. 16/295,615, filed on Mar. 7, 2019, entitled "DEPLOYABLE STRUCTURE FOR USE IN ESTABLISHING A REFLECTARRAY ANTENNA", which is a continuation of U.S. application Ser. No. 15/276,725, filed Sep. 26, 2016, which claims the priority benefit of U.S. Provisional Application No. 62/233,115, filed on Sep. 25, 2015, all of which are incorporated by reference into this application in their entirety.

FIELD OF THE INVENTION

The invention relates to a deployable structure and, more specifically, to a deployable structure for use in establishing a reflectarray antenna.

BACKGROUND OF THE INVENTION

In applications requiring a high-gain antenna, there are at least three types of antennas that are typically employed, namely, a parabolic antenna, phased-array antenna, and a reflectarray antenna. The basic parabolic antenna includes a parabolic shaped reflector and a feed antenna located at the focus of the paraboloid and directed towards the reflector. The phased-array antenna includes multiple antennas with a feed network that provides a common signal to each of the antennas but with the relative phase of the common signal being fed to each of the antennas established such that the collective radiation pattern produced by the array of antennas is reinforced in one direction and suppressed in other directions, i.e., the beam is highly directional. In many applications, the phased-array antenna is preferred to the parabolic antenna because a phased-array antenna can be realized with a lower height profile relative to the parabolic antenna. However, the phased-array antenna typically requires a complicated and/or expensive feed network and amplifier structures. The basic reflectarray antenna includes a reflectarray that is flat or somewhat curved and a feed antenna directed towards the reflectarray. The reflectarray includes an array of radiating elements that each receive a signal from the feed antenna and reradiate the signal. Each of the radiating elements has a phase delay such that the collective reradiated signal produced by the array of radiating elements is in a desired direction. Importantly, the radiating elements are fed by the feed antenna. As such, relative to the phased-arrayed antenna, the reflectarray avoids the need for a feed network to provide a signal to each of the radiating elements.

An application that frequently requires a high-gain antenna is a space-related application in which the antenna is associated with a spacecraft, e.g., a communication or radar imaging satellite. Such space-related applications typically impose an additional requirement of deployability on the design of a high-gain antenna, i.e., the antenna needs to be able to transition from a stowed/undeployed state in which the antenna is inoperable or marginally operable to unstowed/deployed state in which the antenna is operable. As such, the high-gain antenna in these applications is coupled with a deployment mechanism that is used to transition the antenna from the stowed/undeployed state to the unstowed/deployed state. Characteristic of many space-related applications for such antennas is that the antenna and deployment mechanism occupy a small volume in the undeployed state relative to the volume occupied by the antenna and deployment mechanism in the deployed state.

One approach for realizing a deployable high-gain antenna suitable for use on a spacecraft is a parabolic antenna structure that includes a wire mesh reflector, a feed antenna, and a deployment mechanism. The deployment mechanism operates to transition: (a) the wire mesh reflector from a stowed state in which the reflector is folded to an unstowed state in which the reflector is supported in a paraboloid-like shape by a frame associated with the deployment mechanism and (b) the wire mesh reflector and the feed antenna from an inoperable stowed state in which the wire mesh reflector and feed antenna are not operably positioned relative to one another to an unstowed state in which the wire mesh reflector and feed antenna are operatively positioned relative to one another. Characteristic of such deployable parabolic antenna structures is a high part count and the need for a relatively large volume to accommodate the stowed wire mesh reflector, feed antenna, and deployment mechanism.

A second approach for realizing a deployable high-gain antenna suitable for use on a spacecraft is a reflectarray antenna structure that includes a two-layer reflectarray membrane, a feed antenna, and an inflatable deployment mechanism. The inflatable deployment mechanism operates to transition: (a) the reflectarray membrane from a stowed state in which the membrane is folded to an unstowed state in which the inflated deployment mechanism forms a frame that is used in tensioning the reflectarray membrane into a flat shape, similar to trampoline and (b) the reflectarray membrane and the feed antenna from an inoperable stowed state in which the reflectarray membrane and feed antenna are not operably positioned with respect to one another to an unstowed state in which the reflectarray membrane and the feed antenna are operably positioned relative to one another. Characteristic of such a deployable reflectarray are difficulties in understanding the deployment kinematics and reliability challenges, particularly in space-based applications.

SUMMARY OF THE INVENTION

A deployable structure for use in establishing a reflectarray antenna is provided that is suitable for use in applications in which elements that are used to form the reflectarray antenna structure need to transition from an undeployed state in which the elements of the deployable structure conform to a particular volume in which the elements are not situated so as to function in a reflectarray antenna to a deployed state in which the elements are situated so as to function in a reflectarray antenna. One such application for such a deployable structure is as part of a space vehicle, (e.g., a communication or radar imaging satellite) in which elements of the structure typically need to conform to a compact or dimensionally constrained volume for at least a portion of the launch of the space vehicle and then be deployed from the compact or dimensionally constrained space so as to facilitate the establishment of a reflectarray antenna structure that typically occupies a considerably greater volume.

In one embodiment, a deployable structure is provided that includes: (a) a flexible reflectarray or reflectarray membrane that is capable of being placed in a folded state and in an unfolded state in which the flexible reflectarray can function as part of a reflectarray antenna and (b) a deployment mechanism for transitioning the flexible reflectarray between the folded and unfolded states. The deployment mechanism includes an endless pantograph that is adapted for transitioning between an undeployed state in which the endless pantograph has a closed shape with an undeployed perimeter having a first length and a deployed state in which the endless pantograph has a closed shape with a deployed perimeter having a second length that is greater than the first length. The deployment mechanism also includes an energy providing device that provides energy that is used to transition the endless pantograph between from the undeployed state towards the deployed state. The endless pantograph is operatively connected to the flexible reflectarray. Initially, when the deployable structure is in the undeployed state, the flexible reflectarray is in a folded state and the endless pantograph is in an undeployed state characterized by having a perimeter with the first length. To transition the deployable structure transitions from the undeployed state towards the deployed state, the energy providing device is used in causing the endless pantograph to transition from the undeployed state in which the endless pantograph has a perimeter with the first length towards the deployed state, thereby increasing the perimeter length of the endless pantograph. As a consequence of the transition of the endless pantograph from the undeployed state towards the deployed state, the attached flexible reflectarray transitions from the folded state towards the unfolded state (typically, relatively flat or planar).

In one embodiment of the deployable structure, the endless pantograph has polygonal shape with at least three sides. Comprising the endless pantograph are linear sub-pantographs (i.e., pantographs that form the endless pantograph and extend in a substantially straight line when transitioning between the undeployed and deployed states) associated with each side of the polygonal shape and vertex structures that each extend between an end of one of the sub-pantographs and the end of the immediately adjacent sub-pantograph. In both the undeployed and deployed states, the sub-pantographs and vertex structures define a plane polygon with the linear sub-pantographs defining the edges of the polygon and the vertex structures defining the vertices of the polygon. In the undeployed state, the sub-pantographs define an undeployed perimeter with a first length. In a deployed state, the sub-pantographs define a deployed perimeter with a second length that is greater than the first length.

In another embodiment of the deployable structure, the endless pantograph comprises two sets of linear sub-pantographs. The first set of linear sub-pantographs includes three or more linear sub-pantographs that define the edges of a polygon in the undeployed and deployed states. The second set of linear sub-pantographs comprises the same number of linear sub-pantographs as the first set of linear sub-pantographs and also define the edges of a plane polygon in the undeployed and deployed states. The second set of sub-pantographs is located within the first set of sub-pantographs and oriented such that each of the linear sub-pantographs of the second set of sub-pantographs is disposed adjacent to a linear sub-pantograph of the first set of linear sub-pantographs of substantially the same length. As such, each linear sub-pantograph of the first set of linear sub-pantographs corresponds to one of the linear sub-pantographs of the second set of linear sub-pantographs. Each of the linear sub-pantographs of the first set of linear sub-pantographs is pivotally connected to the corresponding linear sub-pantograph of the second set of linear sub-pantographs (i.e., the corresponding linear sub-pantographs form a stacked linear sub-pantograph in which the constituent linear sub-pantographs lie in different planes). Further, the two sub-pantographs that form a stacked linear sub-pantograph are offset, i.e. the center or mid-leg pivot points are not collinear when the sub-pantographs are in an undeployed state. An offset of 180° provides the greatest increase in stiffness relative to a polygonal endless pantograph with sides formed by single sub-pantographs. However, other offsets are feasible. The two sets of linear sub-pantographs can be characterized as a plurality of composite stacked linear sub-pantographs with each composite stacked linear sub-pantograph having two linear sub-pantographs that are pivotally connected, lie in different planes, and are offset relative to one another. The endless pantograph also includes vertex structures that each extend between an end of a composite stacked linear sub-pantograph and the end of an adjacent composite stacked linear sub-pantograph. The endless pantograph structure with two sets of composite stacked linear sub-pantographs has an undeployed perimeter length that that is only slightly greater than the perimeter length of a comparable endless pantograph with sides formed by a single set of linear sub-pantographs (i.e., an endless pantograph with a single set of linear sub-pantographs that substantially has the same perimeter length when fully deployed as the endless pantograph structure with two sets of composite stacked linear sub-pantographs when fully deployed).

In yet another embodiment of the deployable structure, the endless pantograph comprises at least three composite linear sub-pantographs with each of the at least three composite linear sub-pantographs having a first linear pantograph that is interlaced with, pivotally connected to, and offset relative to a second linear pantograph (i.e., an interlaced linear pantograph in which the two pantographs lie in the same plane). An offset of 180° provides the greatest increase in stiffness relative to endless pantograph with sides formed by a single set of linear sub-pantographs. However, other offsets are feasible. A vertex structure extends between each end of a composite linear sub-pantograph and the end of an adjacent composite linear sub-pantograph. In this embodiment, the composite linear sub-pantographs that form each side of the endless pantograph can be characterized as composite interlaced linear sub-pantographs. The endless pantograph structure with composite linear sub-pantographs that each employ two interlaced linear sub-pantographs has an undeployed perimeter length that is greater than the perimeter length of a comparable endless pantograph with composite linear sub-pantographs that each employ stacked sub-pantographs (i.e., an endless pantograph with stacked linear sub-pantographs that substantially has the same perimeter length as the endless pantograph with interlaced linear sub-pantographs when fully deployed).

While endless pantographs with polygonal shapes have certain desirable properties, an endless pantograph that is circular is also feasible and perhaps desirable in certain applications. Further, endless circular pantographs that are stacked or interlaced are also feasible.

Yet another embodiment of the deployable structure employs a limiter to limit the extent to which the endless pantograph is deployed. In one embodiment, the limiter includes a plurality of pins with each pin associated with a first leg of the endless pantograph and adapted to engage a second leg of the endless pantograph to which the first leg is pivotally attached in a manner that prevents relative rotation between the first and second legs once a desired angle between the first and second legs is reached during deployment. In a particular embodiment, a pin is associated with the two pivot joints located at the ends of each leg comprising the endless pantograph. The use of these pins, at least in endless pantographs with polygonal shapes, serves to limit the deployment of the endless pantograph, distribute the load, and reduce bowing in the deployed linear sub-pantographs (particularly when relatively long sub-pantographs are employed).

In a particular embodiment of the deployable structure, the energy providing device includes one or more springs that provide the energy for transitioning the endless pantograph and the flexible reflectarray from the undeployed state towards the deployed state. In a particular embodiment, the energy providing device comprises a spring associated with each pivot connection between the legs that form the endless pantograph. When the endless pantograph is in the undeployed state, the springs cumulatively store sufficient potential energy to transition the endless pantograph from the undeployed state to the deployed state. In the regard, when the restraint on the endless pantograph that maintains the endless pantograph in the deployed state is removed or reduced, the springs cause the legs that comprise the endless pantograph to rotate relative to one another and thereby transition the pantograph from the undeployed state towards the deployed state. Once the endless pantograph is in the deployed state, the springs store less potential energy than in the undeployed state but sufficient potential energy to maintain the endless pantograph in the deployed state based on the forces the deployed pantograph and reflectarray are reasonably expected to encounter in the relevant application. It should also be appreciated that by the use of multiple springs and the use of the multiple springs to store more potential energy than is needed to deploy and maintain the deployment of the endless pantograph and flexible reflectarray the failure of one or more springs can be accommodated.

In another embodiment of the deployable structure, the deployment mechanism includes a deployable tape structure for establishing a spatial relationship between the flexible reflectarray and another component of a reflectarray antenna. For instance, the deployable tape structure can be used in establishing the position of a feed antenna, subreflector, or reflectarray subreflector relative to the flexible reflectarray. In a particular embodiment, the deployment structure includes at least three deployable tapes, each tape extending from a first end that is operatively engaged to the endless pantograph to a second end that is operatively connected to an element that facilitates the positioning of the deployed reflectarray (supported by deployed endless pantograph) relative to another component of a reflectarray antenna. In a particular embodiment, the second end of each of the tapes is operatively connected to or adjacent to a feed antenna of the reflectarray antenna. In the deployed state, the three tapes contribute to the positioning of the deployed endless pantograph and the deployed reflectarray relative to the feed antenna in a reflectarray antenna. More specifically, the deployed tapes and the deployed endless pantograph substantially define a pyramidic or conic structure. In a particular embodiment, at least two of the tapes are of different lengths. As such, the deployable structure, when fully deployed, establishes the reflectarray and the feed antenna in a configuration known as a reflectarray antenna with an offset feed, i.e., the boresight of the feed antenna is not parallel to a line perpendicular to the deployed reflectarray. Further, the deployed reflectarray, the endless pantograph, and the deployed tapes substantially define an oblique pyramid or oblique cone. In a specific embodiment, each of the tapes transitions between an undeployed state characterized by a substantially portion of the tape being in a roll and a small portion of the tape extending linearly and a deployed state characterized by a substantial portion of the tape extending linearly. Further, each of the tapes is preferably a quasi-dual stable tape that exhibits: (a) a first stable state when the entire tape is wound or rolled, (b) a second stable state when the entire tape is straight, and (c) a propensity to transition towards the second stable state when a portion of the tape is in the first state and another portion of the tape is in the second state. As such, when a significant portion of the tape is rolled but a portion of the tape is straight or extends linearly, the tape is storing energy that can subsequently be used to transition the tape towards the second stable state. The use of such tapes facilitates the deployment of the tapes between the undeployed and deployed states.

In a particular embodiment, the deployable structure is configured so that, when the structure is in the deployed state, the feed antenna is located between the deployed flexible reflectarray and the body of a satellite. Stated differently, the deployment mechanism and, more specifically, the tapes are configured so as to move the endless pantograph and flexible reflectarray away from the feed antenna and the spacecraft.

BRIEF DESCRIPTION OF THE DRAWINGS

FIGS. 5A and 5B are two perspective exploded views of two crossing legs of the embodiment of a portion of an endless pantograph illustrated in FIG. 2 that illustrate the mid-point pivot connection between the two legs and the spring associated with the mid-point pivot connection;

FIG. 6 is a top view of the embodiment of an endless pantograph (in an undeployed state) associated with the deployable structure shown in FIG. 1 and the limiting pins associated with the endless pantograph;

FIGS. 7A-7D respectively illustrate the embodiment of the endless pantograph shown in the FIG. 6 in an undeployed state, at the onset of deployment, further partially deployed, and fully deployed;

DETAILED DESCRIPTION

Figure 1A:
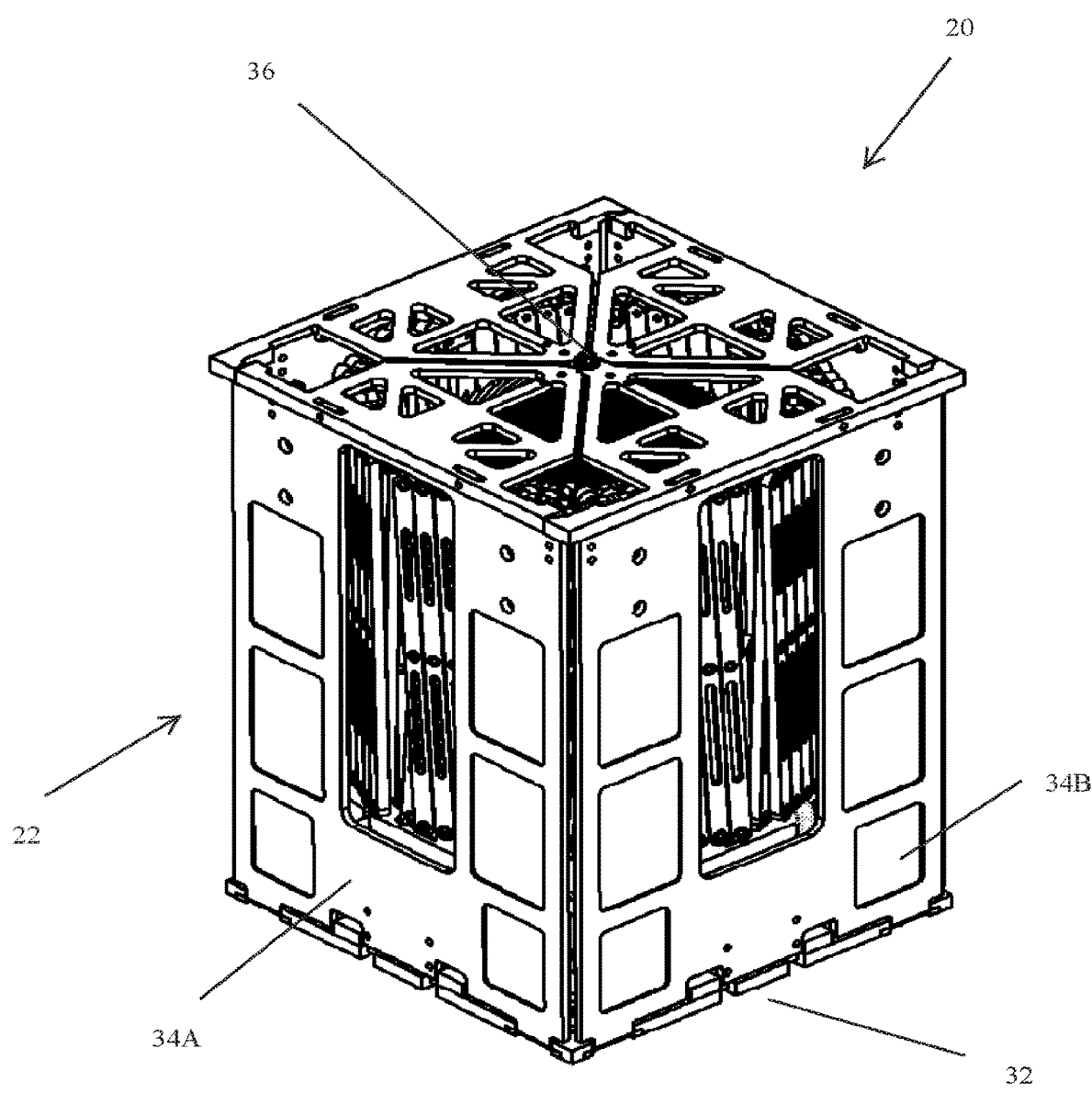
FIGS. 1A-1F respectively illustrate an embodiment of the deployable structure for use in establishing a reflectarray antenna in an undeployed state, at the onset of deployment, partially deployed, further partially deployed, yet further partially deployed, and fully deployed.

With reference to FIGS. 1A-1F, an embodiment of a deployable structure 20 for use in establishing a reflectarray antenna (hereinafter referred to as "the deployable structure 20") is described. The deployable structure 20 conforms to a design specification which requires the deployable structure 20, in the undeployed state, to fit within a volume that is 20 cm×20 cm×25 cm. Additionally, the deployable structure 20 is required to have a mass of no more than 4 kg. Although the deployable structure 20 conforms to the design specification, it should be appreciated that adaptation to other form factors and mass requirements is feasible.

Generally, the deployable structure 20 includes a canister 22, a feed antenna 24, a flexible reflectarray 26, and a deployment mechanism 28.

With reference to FIGS. 1A-1E, the canister 22 serves to store the feed antenna 24, flexible reflectarray 26, and the deployment mechanism 28 in an undeployed state and provides a base for supporting the feed antenna 24, flexible reflectarray 26, and the deployment mechanism 28 in the deployed state. With reference to FIG. 1A, when the deployable structure 20 is in the undeployed state, the canister 22 conforms to the design specification that requires the undeployed structure to fit within a volume that is 20 cm×20 cm×25 cm. Within this specific volume, the feed antenna 24 occupies a first volume within the canister 22, the flexible reflectarray 26 is folded so as to conform to a second volume within the canister 22, and the deployment mechanism 28 is in an undeployed state that conforms to a third volume within the canister. With reference to FIG. 1F, when the deployable structure 20 is in the deployed state, the canister 22 and the deployment mechanism 28 cooperate to position the deployed flexible reflectarray 26 relative to the feed antenna 24 so as to conform to a reflectarray antenna structure with an offset feed, i.e., the boresight of the feed antenna 24 is not parallel to a line perpendicular to the plane of the deployed flexible reflectarray 26.

Figure 1B:
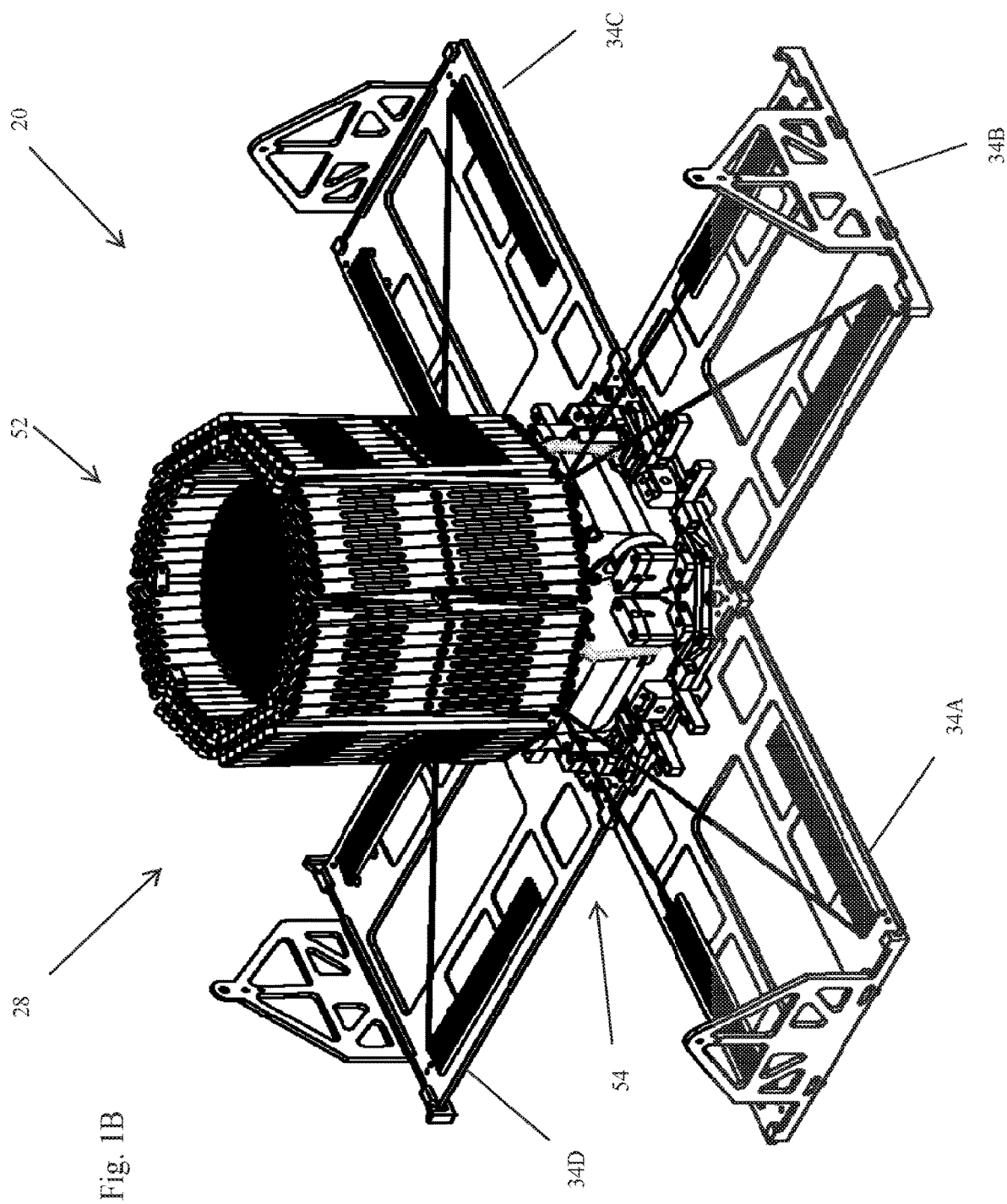
Figure 1C:
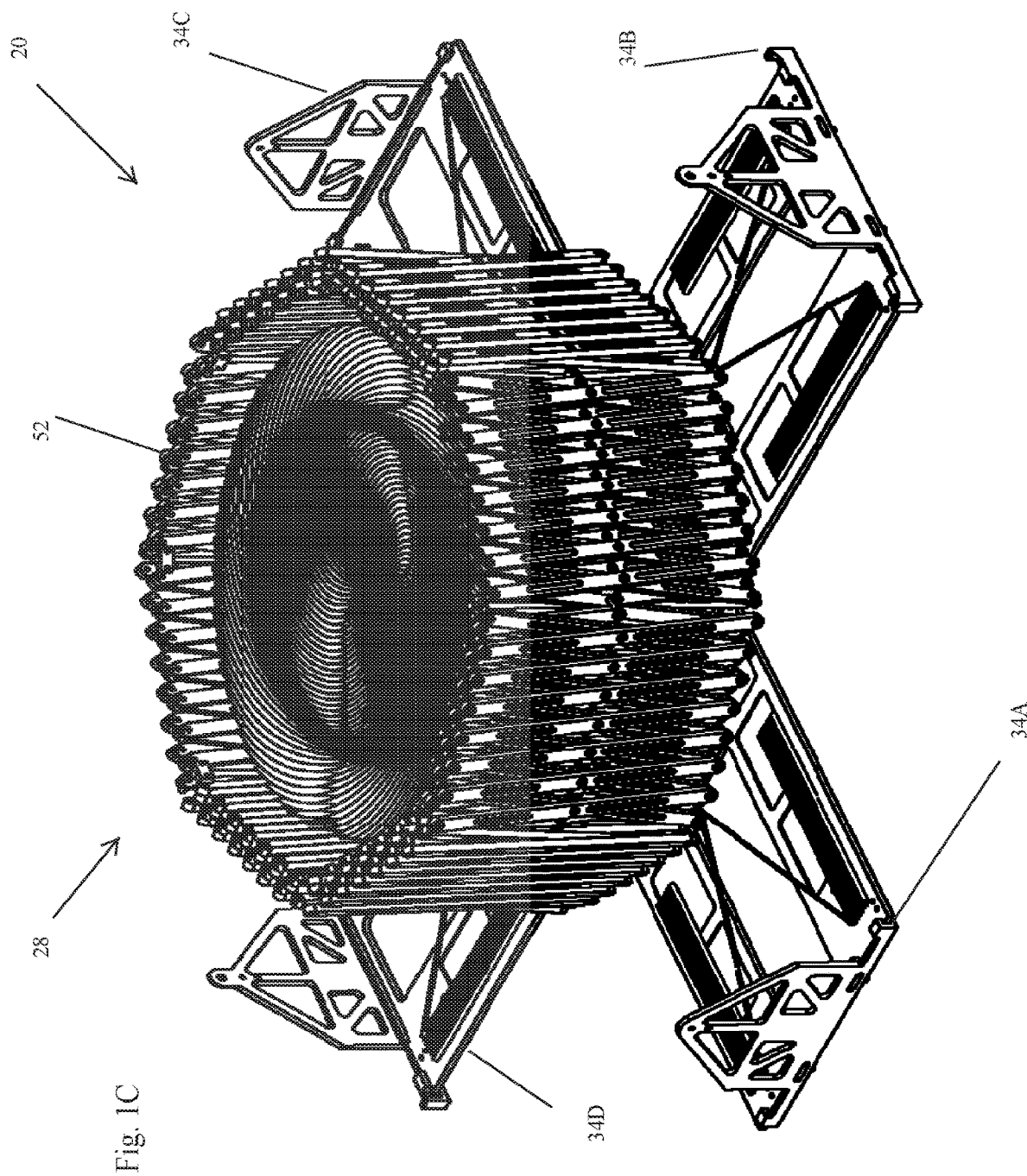
Figure 1D:
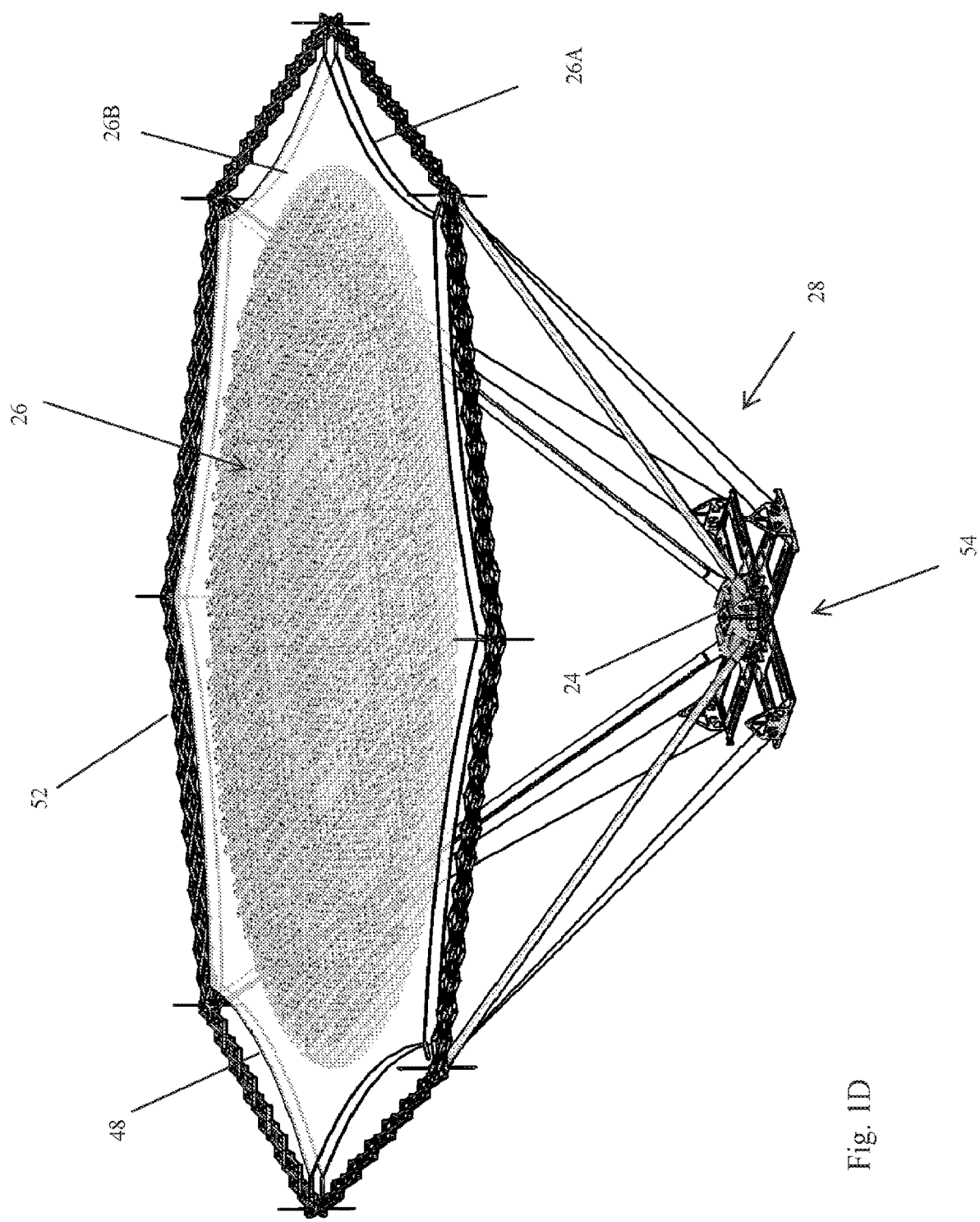
Figure 1E:
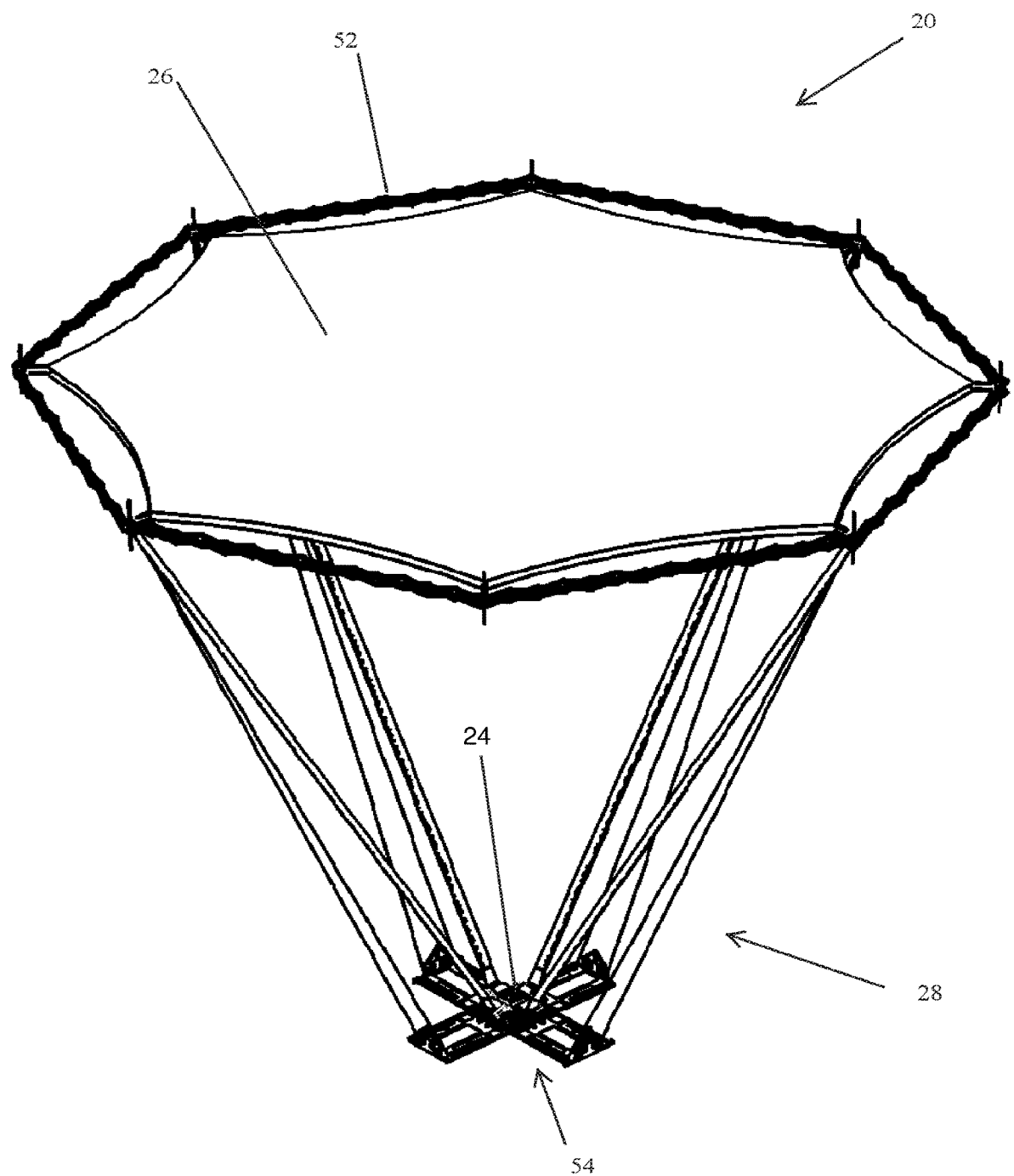
Figure 1F:
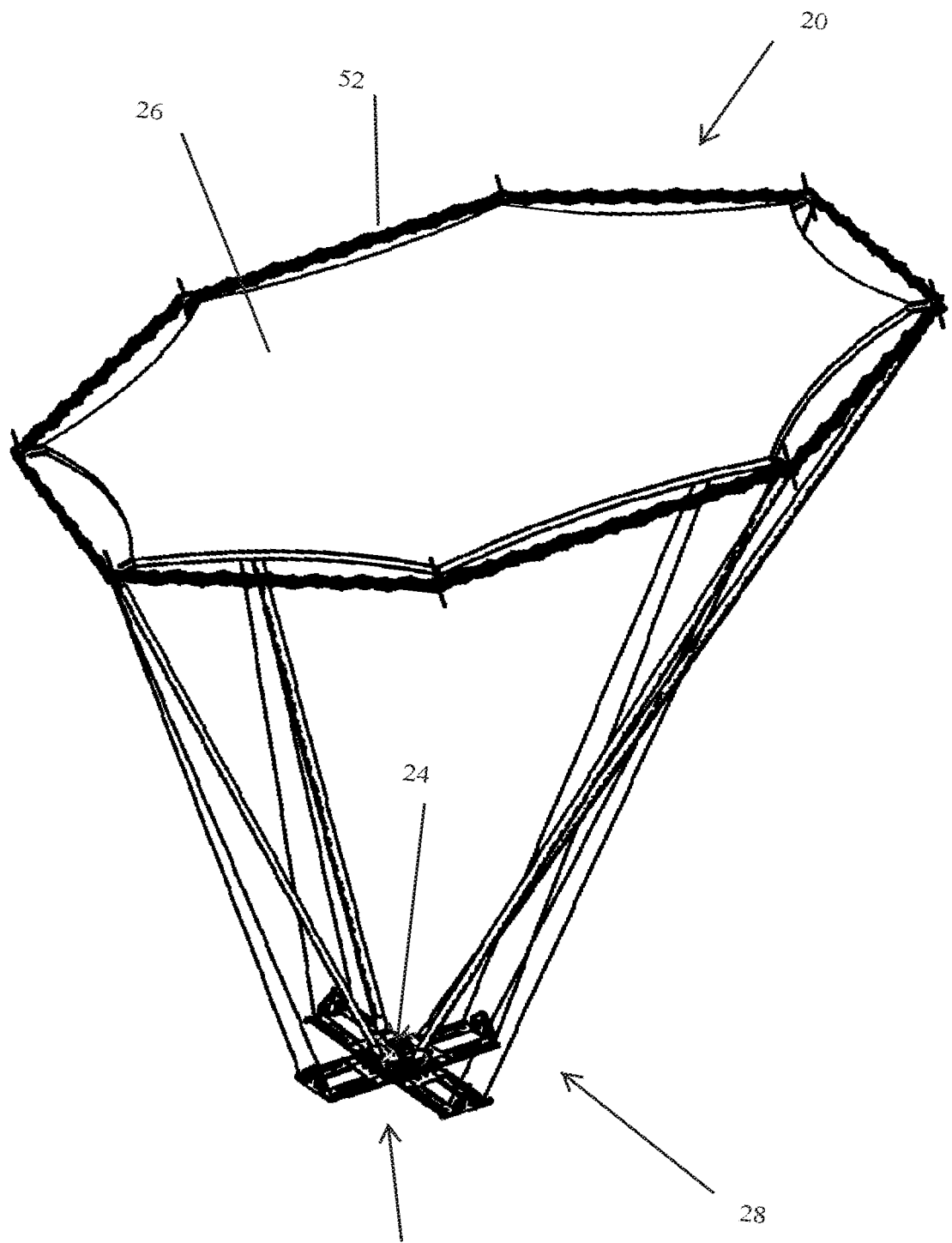

With continuing reference to FIGS. 1A-1F, the canister 22 generally comprises a base 32 and four spring-loaded and latchable doors 34A-34D that form the sides of the cube and the top of the cube. A releasable latch structure 36 holds the doors 34A-34D in the undeployed state shown in FIG. 1A. The releasable latch structure 36 can take a number of different forms. In the illustrated embodiment, the latch 36 employs a meltable pin that disintegrates upon the application of an electrical current, thereby allowing the spring-loaded doors 34A-34D to deploy as shown in FIG. 1B. It should be appreciated that other embodiments of a canister that conforms to the design specification and are suitable for use the feed antenna 24, flexible reflectarray 26, and deployment mechanism 28 are feasible. Moreover, embodiments of canisters that conform to other dimensional requirements and that support other embodiments of a feed antenna, flexible reflectarray, and deployment mechanism appropriate for these other dimensional requirements or other application are feasible.

With continuing reference to FIGS. 1A-1E, the feed antenna 24 is an antenna that is capable of feeding the flexible reflectarray 26 when the deployable structure 20 is in the deployed state. In the illustrated embodiment, the feed antenna 24 is a low-profile phased array antenna. In other embodiments, a horn antenna is employed for the feed antenna.

With continuing reference to FIGS. 1A-1E, the flexible reflectarray 26 includes: (a) a first flexible membrane that supports an array of reflectarray elements and (b) a second flexible membrane that serves as a ground plane in the deployed state. A specified distance between the first flexible membrane and the second flexible must be maintained for proper operation of the flexible reflectarray 26 when deployed. This spacing can be achieved in a number of different ways. For example, connectors that attached the flexible reflectarray 26 to the deployment mechanism 28 and the tension applied to the flexible reflectarray 26 by the deployment mechanism 28 can be used to maintain the required spacing between the first and second flexible membranes and with only open space between the two membranes. Another alternative is to place a compressible and flexible dielectric structure between the first and second flexible membranes to facilitate the desired spacing between the membranes. Yet another option is to employ substantially non-compressible post like structures at various locations between the membranes to facilitate the desired spacing between the membranes. Generally, when the flexible reflectarray 26 is in the deployed state, the outer edge 48 of the reflectarray defines a polygon-like shape that has catenary-shaped edges instead of straight edges. The flexible characteristic of the flexible reflectarray 26 allows the reflectarray to be folded so as to fit within a specified volume within the canister 22 when the reflectarray is in the undeployed state. Other flexible reflectarrays known to those skilled in the art are feasible.

With continuing reference to FIGS. 1A-1F, the deployment mechanism 28 comprises: (a) an endless pantograph 52 for transitioning the flexible reflectarray 26 between an undeployed, folded state and a deployed state in which the flexible reflectarray 26 is substantially planar and (b) a tape dispensing structure 54 that operates to position the feed antenna 24 and the flexible reflectarray 26 relative to one another so to conform to a reflectarray antenna structure with an offset feed. Characteristic of the endless pantograph 52 and other endless pantographs is that the pantograph forms a closed loop and the perimeter defined by the pantograph has a first length in the undeployed state and a second length that is greater than the first length when the pantograph is transitioning from the undeployed state towards and at the deployed state.

With reference to FIGS. 1A-1F, 2, and 6, the endless pantograph 52 is an endless polygonal pantograph, i.e., the pantograph has a polygonal shape when undeployed and when fully deployed. More specifically, the pantograph 52 is a composite polygonal pantograph that includes two eight-sided polygonal sub-pantographs. In the illustrated embodiment, each of the eight-sided polygonal sub-pantographs comprises eight linear sub-pantographs with each linear sub-pantograph having one end attached to the end of a second linear sub-pantograph and the other end attached to a third linear sub-pantograph. The pantograph 52 is more specifically characterized as a stacked polygonal pantograph with: (a) a first eight-sided polygonal sub-pantograph 76A in which the links of the pantograph occupy a first polygonal cylindrical volume and (b) a second eight-sided polygonal sub-pantograph 76B in which the links of the pantograph occupy a second polygonal cylindrical volume that is within the volume defined by the interior surface of the first polygonal cylindrical volume, (c) each side of the second eight-sided polygonal sub-pantograph 76B pivotally engaged to a corresponding side of the first eight-sided polygonal sub-pantograph 76A, and (d) each side of the pantograph 52 connected to two adjacent sides of the pantograph. The pantograph 52 can also be characterized as eight stacked linear sub-pantographs 78A-78H with each stacked linear sub-pantograph having one end attached to the end of a second stacked linear sub-pantograph and the other end attached to a third stacked linear sub-pantograph. Each of the stacked linear sub-pantographs 78A-78H can be characterized as having a first and second linear sub-pantographs 80A, 80A that are stacked, pivotally attached to one another, and offset by 180°. While the pantograph 52 has eight sides, it should be appreciated that an endless polygonal pantograph can have three or more sides. The pivotal attachment between the first eight-sided polygonal sub-pantograph 76A and the second eight-sided polygonal sub-pantograph 76B establishes a 180° offset between the first and second eight-sided polygonal sub-pantographs. More specifically, the two linear sub-pantographs that are embodied in each of the stacked linear sub-pantographs 78A-78H have an offset of 180°. This offset renders the pantograph 52 stiffer in the deployed state than a pantograph in which each side of the pantograph is realized with single linear sub-pantograph.

Figure 4:
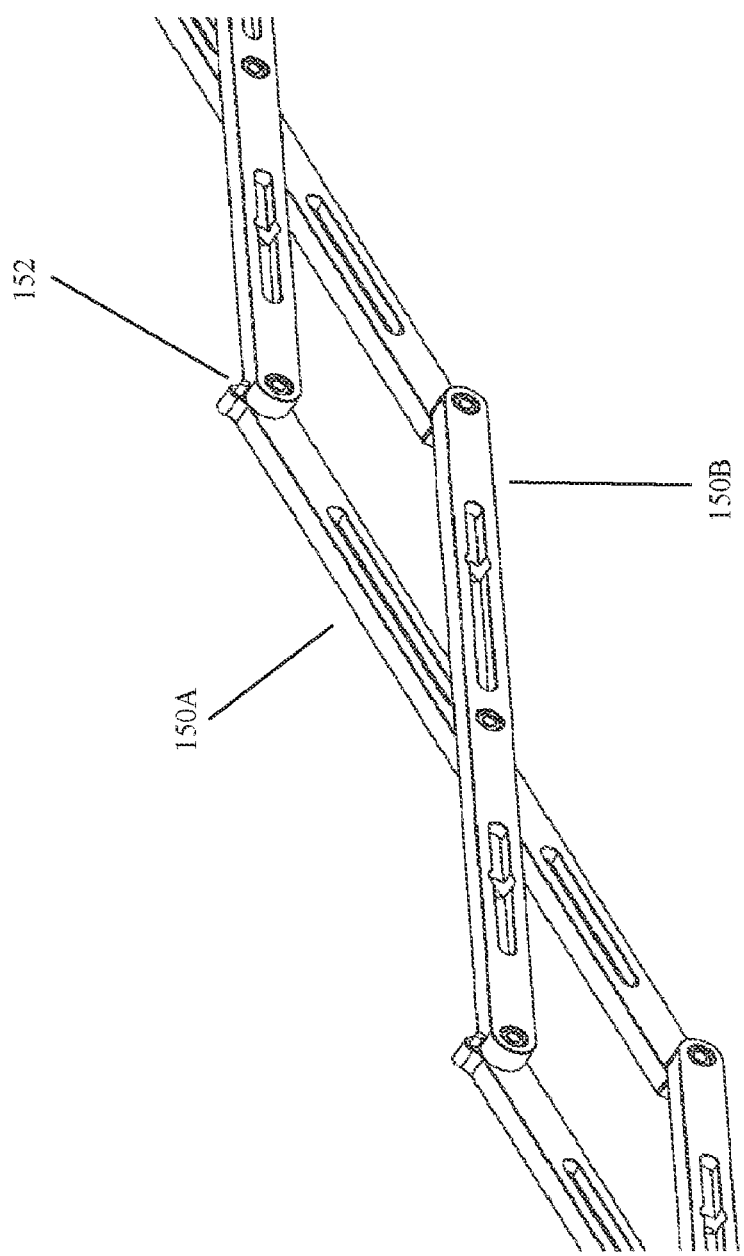
FIG. 4 illustrates a portion of a sub-pantograph of the embodiment of a portion of an endless pantograph illustrated in FIG. 2 and pins associated with the ends of two of the legs of the sub-pantograph that limit the extent to which the sub-pantograph is deployed.
Figure 7D:
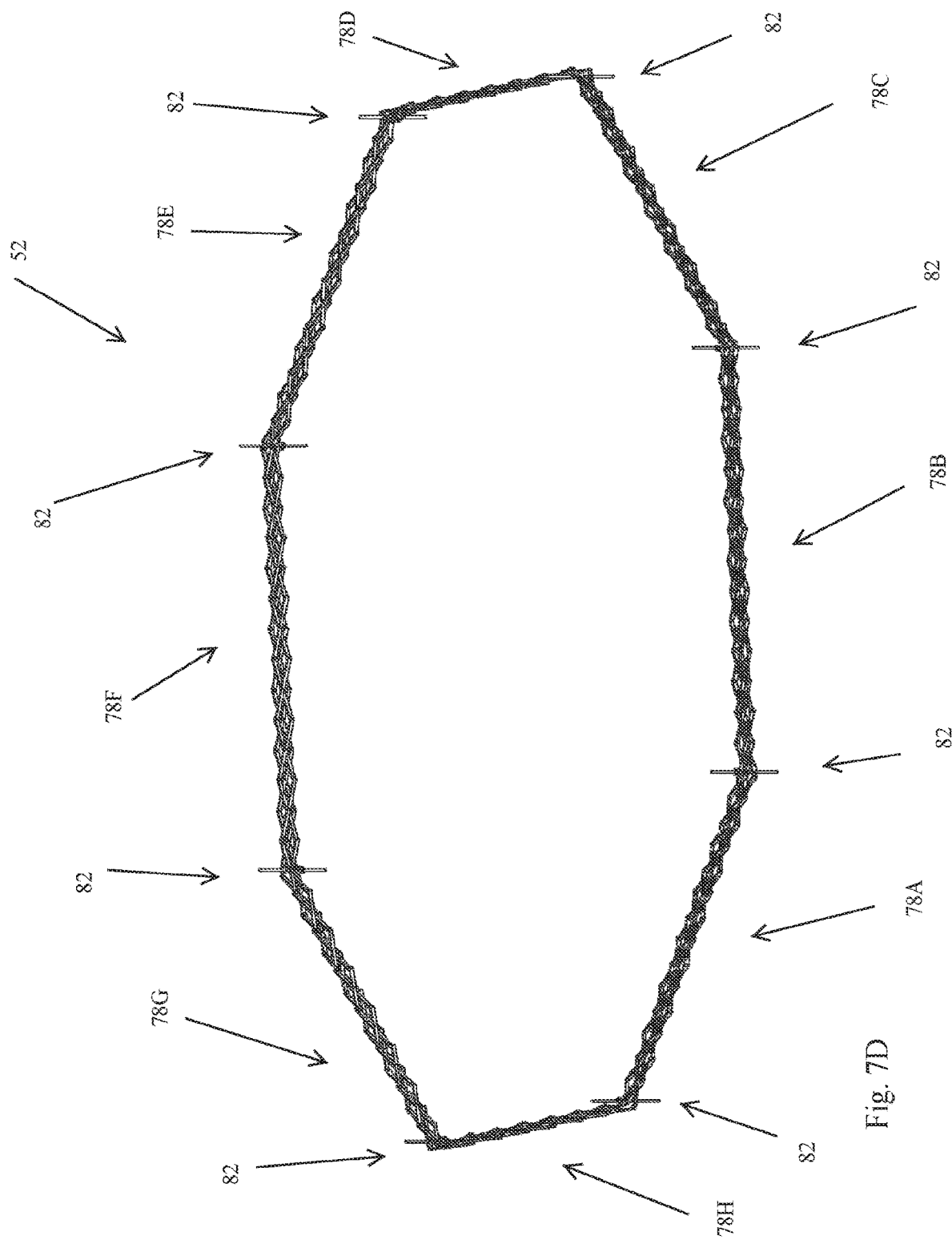

With reference to FIGS. 4, 5A, and 5B, at least one of the linear sub-pantographs 80A, 80B of at least one of the stacked linear sub-pantographs 78A-78H employs a limiting structure that limits the extent to which the endless pantograph 52 deploys. To elaborate, each of the linear sub-pantographs 80A, 80B has at least one pair of crossing legs 150A, 150B. Associated with the crossing leg 150A is a pin 152 that projects away from the crossing leg and is positioned so as to engage another leg of the linear sub-pantograph when the relative rotation of the two legs during deployment of the pantograph has resulted in establishing a predetermined angle between the two legs, thereby limiting the deployment of whichever one of the sub-pantographs 80A, 80B the pin 152 is associated, as well as the entire endless pantograph 52. In the illustrated embodiment of the endless pantograph 52, each of the linear sub-pantographs 80A, 80B includes a first set of parallel legs 154 and a second set of parallel legs 156. Associated with each full-length leg of the first set of parallel legs 154 are two pins that each engage a different leg of the second set of parallel legs 156 to limit the deployment of the sub-pantograph with which the pins are associated, the deployment of the sub-pantograph to which the sub-pantograph is pivotally attached, and the deployment of the endless pantograph 52. Due to the offset of the linear sub-pantographs 80A, 80B, there are partial legs that are shorter than the full-length legs. Depending on the implementation, there may be one pin or no pins that perform a limiting function associated with a partial leg. The use of multiple pins to limit the deployment of the endless pantograph 52 provides redundancy, i.e., one or more pins can fail and the remaining pin or pins still limit the deployment as desired. Further, the use of multiple pins serves with respect to linear sub-pantographs 80A, 80B serves to "stiffen" the pantographs, i.e., reduce the dead band (droop or sag) that may be present when the linear sub-pantograph is deployed, especially when the deployed pantograph extends over a considerable distance and/or is subject to certain loads. The use of multiple pins also reduces tolerancing requirements. Additionally, the use of multiple pins distributes the load being supported by the sub-pantograph over the length of the pantograph. It should be appreciated by those skilled in the art that fewer or more pins or comparable structure can be employed with a sub-pantograph and/or the locations of the pins altered and the benefits scaled accordingly.

With continuing reference to FIGS. 5A-5B, to provide energy for transitioning the endless pantograph 52, a spring structure is utilized that stores potential energy when the endless pantograph 52 is in the undeployed state. In deployment, this potential energy is converted to kinetic energy to facilitate the transition of the pantograph from the undeployed state towards the deployed state. With reference to FIGS. 5A-5B, an embodiment of a spring structure 90 is described. Generally, a spring structure can be located at any pivot point of a pantograph associated with the endless pantograph 52. Further, a single spring structure can potentially provide the energy needed to transition the endless pantograph 52 between the undeployed and deployed states. However, in the illustrated embodiment of the endless pantograph 52, a spring structure is located at each of multiple pivots points of the endless pantograph 52. The spring structure 90 is associated with a pivot structure 92 that is used to establish a center pivot point between the pair of crossing legs or links 150A, 150B of an endless pantograph. The pivot structure 92 includes a first hole 98A associated with cross leg 150A, a second hole 98B associated with crossing leg 150B, a nut 100, and screw 102 that extends through each of the holes and engages the nut to establish a pivot connection between the crossing legs 150A, 150B. In a preferred embodiment, the nut 100, screw 102 and holes 98A, 98B implement a full floating axle structure. The spring structure 90 includes a torsion spring 104, a first housing 106A that is associated with crossing leg 150A and adapted to engage one leg of the spring, and a second housing 106B that is associated with the crossing leg 150B and adapted to engage the other leg of the spring. The first and second housings 106A, 106B and the torsion spring 112 are designed so that, when the crossing legs 150A, 150B are moved so as to place the legs in the undeployed state, potential energy is stored in the torsion spring 104.

With reference to FIG. 1A, when the endless pantograph 52 is in the undeployed state, the endless pantograph 52 is constrained by the canister 22 (which is also in the undeployed state) such that spring structure located at each of the pivots points associated with the endless pantograph 52 is storing potential energy and the cumulative potential energy stored by all of the spring structures is sufficient to deploy the endless pantograph 52. During deployment, the constraint on the endless pantograph 52 is removed and the potential energy stored in each spring structure 90 associated with the endless pantograph 52 is converted to kinetic energy that is used to transition the endless pantograph 52 from the undeployed state towards the deployed state. With reference to FIGS. 7A-7D, the transition of the endless pantograph 52 from the undeployed state to the fully deployed state using the spring structures is illustrated. The spring structure 90 is also designed so that, even when the pantograph 52 is fully deployed, the spring structures cumulatively store potential energy sufficient to substantially maintain the endless pantograph 52 in the deployed state for the reasonably anticipated loads that the pantograph and flexible reflectarray 26 are expected to encounter. Further, the spring structure 90 is also preferably designed to provide sufficient energy to deploy and maintain the endless pantograph 52 and flexible reflectarray 26 in the deployed state even if a predetermined number of the spring structures fail. While the endless pantograph 52 employs a spring structure 90 at each pivot point, embodiments that employ fewer spring structures are feasible. It should be appreciated that many different types of spring structures known to those skilled in the art can be employed to provide the energy for deploying an endless pantograph, including spring structures that employ different types of springs that engage the links of an endless pantograph in a different way.

Figure 2:
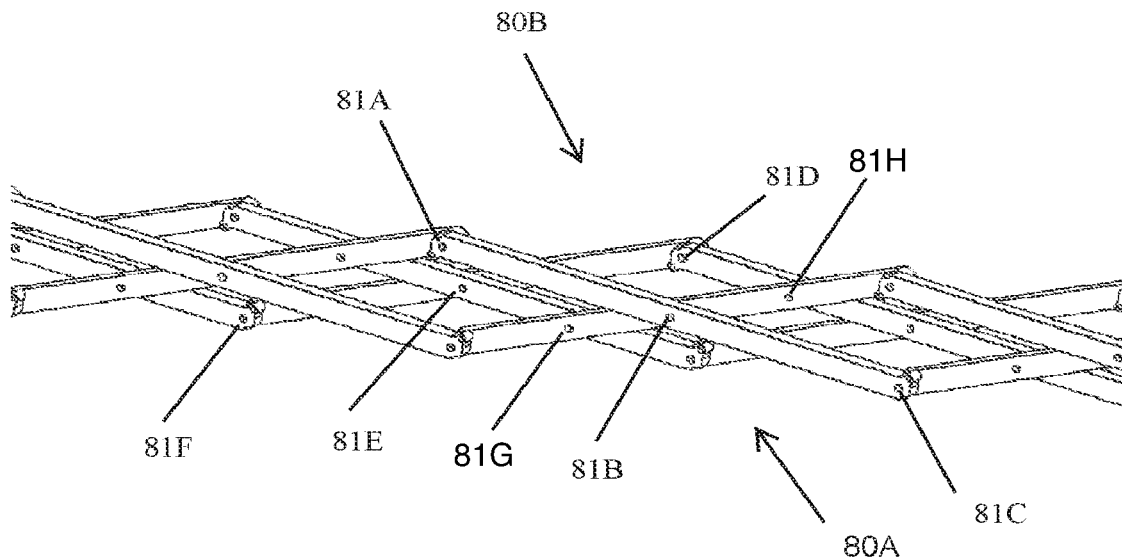
FIG. 2 illustrates a portion of a first embodiment of an endless pantograph structure suitable for use in the deployable structure shown in FIG. 1.

With reference to FIG. 2, the linear sub-pantographs 80A, 80B of each of the stacked linear sub-pantographs 78A-78H are pivotally connected to one another. To elaborate, the outer full-length legs of the first linear sub-pantograph 80A and the inner full-length legs of the first linear sub-pantograph 80A are each adapted for engagement within the first linear sub-pantograph 80A at pivot points 81A-81C. If the first linear sub-pantograph 80A has any partial legs, the partial legs are adapted for pivotal engagement within the first linear sub-pantograph 80A at two pivot points. Similarly, the outer full-length legs of the second linear sub-pantograph 80B and the inner full-length legs of the second linear sub-pantograph 80B are each adapted for engagement within the second linear sub-pantograph 80B at pivot points 81D-81F. If the second linear sub-pantograph 80B has any partial legs, the partial legs are adapted for pivotal engagement within the second linear sub-pantograph 80B at two pivot points. With respect to the pivot connection between the first and second linear sub-pantographs 80A, 80B, the inner full-length legs of the first sub-pantograph 80A and the inner full-length legs of the second sub-pantograph 80B are each adapted for engagement at pivot points 81G, 81H. Should any of the inner legs of the first sub-pantograph 80A or the inner legs of the of the second sub-pantograph 80B be a partial leg, the partial leg is adapted for engagement at one pivot point.

Figure 3:
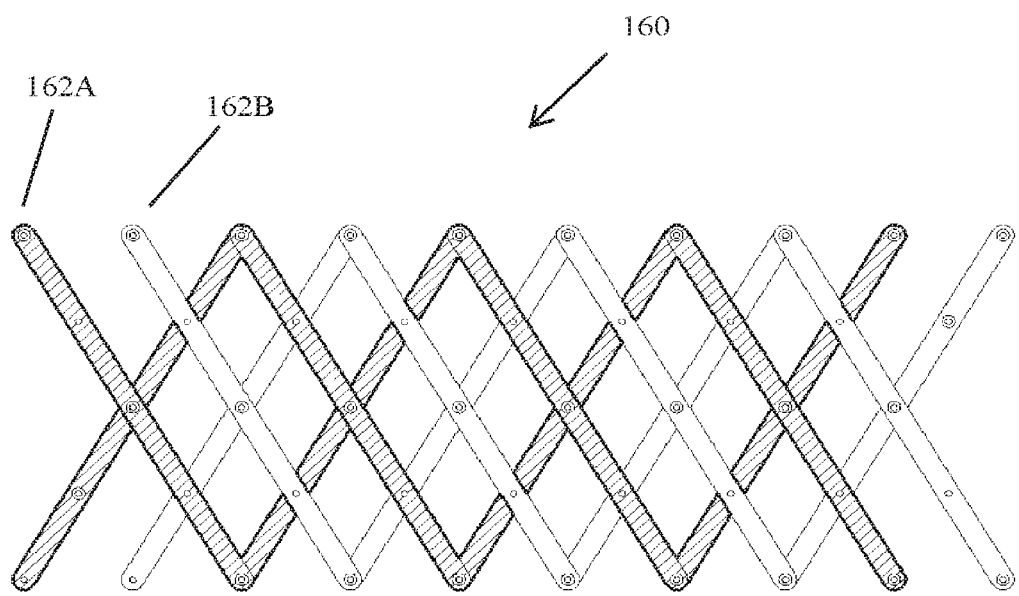
FIG. 3 illustrates a portion of second embodiment of an endless pantograph structure suitable for use in the deployable structure shown in FIG. 1.

With reference to FIG. 3, while the endless pantograph 52 employs stacked linear sub-pantographs 78A-78H, an interlaced linear sub-pantograph 160 can also be employed. The interlaced linear sub-pantograph 160 includes a first linear sub-pantograph 162A and a second linear sub-pantograph 162B that are interlaced with one another. Characteristic of the interlaced linear sub-pantograph 160 is that one of the two legs forming a crossing pair of legs in the first linear sub-pantograph 162A underlies two legs associated with the second linear sub-pantograph 162B and the other one of the two legs forming a crossing pair of legs in the first linear sub-pantograph 162A overlies two legs associated with the second linear sub-pantograph 162B. As such, the first and second linear sub-pantograph 162A, 162B lie in a common plane. The interlaced linear sub-pantograph 160 can be adapted to employ a limiting structure and/or spring structure comparable to those structures described with respect to the stacked linear sub-pantographs 78A-78H. It should also be appreciated that in particular circumstances a circular endless pantograph can be employed (i.e., an endless pantograph that is circular in the undeployed and deployed states). Further, a circular pantograph can employ a limiting structure and spring structure comparable to those structures described with respect to the stacked linear sub-pantographs 78A-78H.

Figure 8:
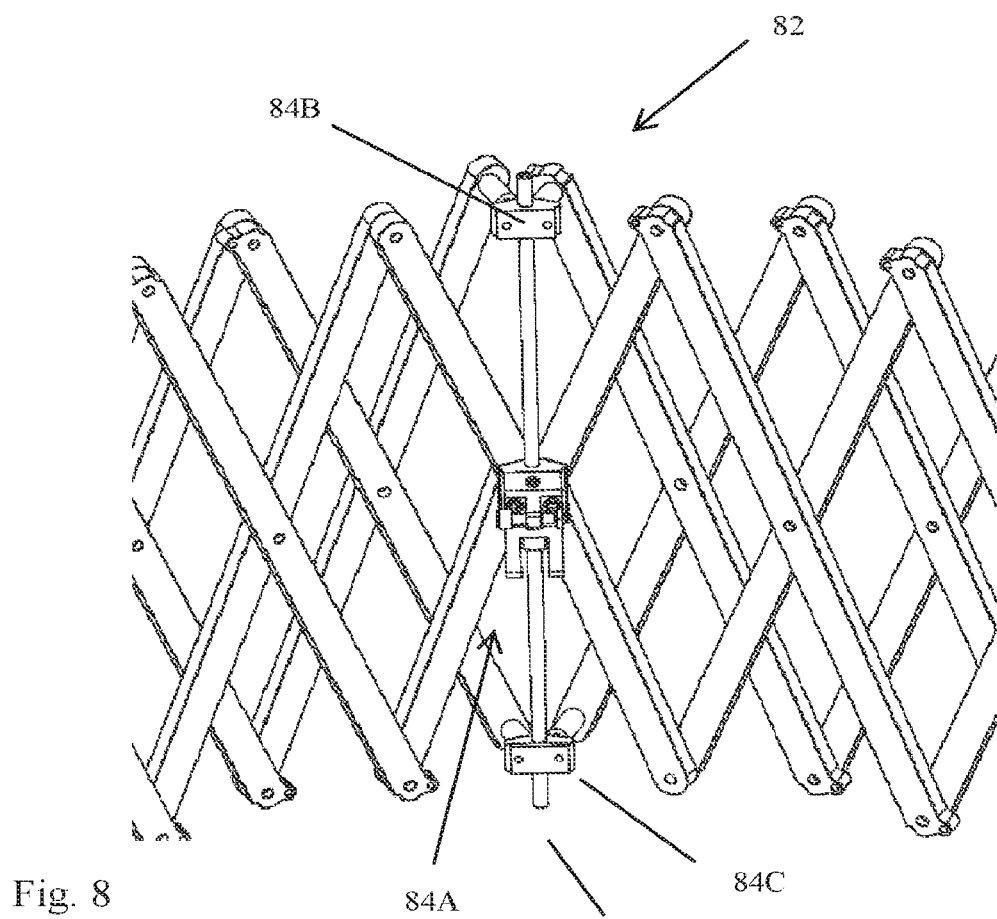
FIG. 8 illustrates an embodiment of a vertex structure that is used to connect two of the composite stacked linear sub-pantographs of the of the endless pantograph shown in FIG. 6.
Figure 9:
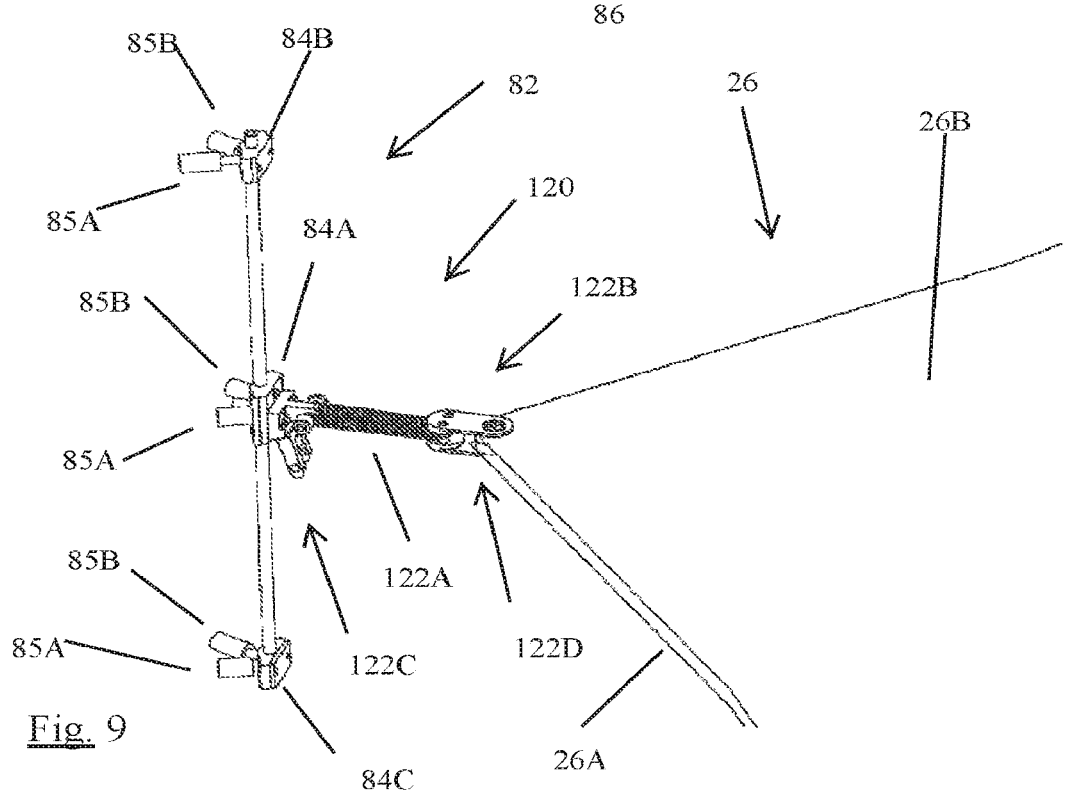
FIG. 9 illustrates a connector structure for connecting a flexible reflectarray to the endless pantograph illustrated in FIG. 6.

With reference to FIGS. 8 and 9, a vertex structure 82 is utilized to connect the end of one of the stacked linear sub-pantographs 78A-78H to the end of another of the stacked linear pantographs 78A-78H. The vertex structure 82, in addition to connecting two stacked linear pantographs to one another, also maintains the angle between the two linear stacked pantographs. In the stacked polygonal pantograph embodiment of the pantograph 52, the interior angle between each pair of adjacent linear stacked pantographs is approximately 135°. The vertex structure 82 includes: (a) a housing 84A that engages two center pivot points, one center pivot point associated with one of the stacked linear sub-pantographs and the other center pivot point associated with the other stacked linear sub-pantograph, (b) a first bushing 84B that engages the two end pivot points, one end pivot point associated with one of the stacked linear sub-pantographs and the other end pivot point associated with the other stacked linear sub-pantograph, and (c) a second bushing 84C that engages the two end pivot points, one end pivot point associated with one of the stacked linear sub-pantographs and the other end pivot point associated with the other stacked linear sub-pantograph. Each of the housing 84A and first and second bushings 84B, 84C includes a first pin 85A that is substantially perpendicular to a first face and a second pin 85B that is substantially perpendicular to a second face. The interior angle between the faces is approximately 135° and the angle between the two pins is approximately 45°. Each of the pins pivotally engages a hole in a leg associated with one of the pantographs such that the link can rotate about the pin. The 45° angle between the pairs of pins associated housing 84A and bushings 84B, 84C cooperate to maintain an approximately 135° interior angle between the two pantographs. The vertex structure 82 also includes a pin 86 that is located within a hole associated with each of the housing 84A and bushings 84B, 84C. The pin 86 is fixed relative to the housing 84A, i.e., linear relative movement between the pin and the housing 84A is prevented. However, linear relative movement between the pin 86 and the other two bushings 84B, 84C is not prevented. When the endless pantograph 52 is in an undeployed state, the housing 84A is separated from each of the bushings 84B, 84C by approximately half the length of a full-length leg of a stacked linear sub-pantograph. With reference to FIGS. 7A-7D, as the endless pantograph 52 transitions toward the deployed state, the distance between the housing 84A and each of the bushings 84B, 84C decreases. Further, each of the vertex structures 82 operates to maintain the approximately 135° angle between the two stacked linear sub-pantographs engaged by the vertex structure 82 as the endless pantograph 52 transitions between the undeployed and deployed states.

With reference to FIG. 9, an embodiment of a connector 120 for establishing a connection between the flexible reflectarray 26 and the endless pantograph 52 is described. Generally, the connector 120 includes a tension spring 122A, a first interface 122B for engaging the tension spring 122A and the flexible reflectarray 26, and a second interface 122C for engaging the tension spring 122 and the endless pantograph 52 or, more specifically, the vertex structure 82 of the endless pantograph 52. The first interface 122B employs a spacer structure 122D to facilitate a desired spacing between the two membranes of the flexible reflectarray 26. In the illustrated embodiment, multiple connectors 120 are employed, one for connecting the reflectarray to each of the vertex structures. The use of a tension spring allows stresses placed on the flexible reflectarray 26 during deployment and possibly after full deployment to be accommodated. Other connectors known to those skilled in the art that are capable of absorbing potentially undesirable stresses placed upon the flexible reflectarray 26 are feasible. Further, in certain applications, a connector that is capable of absorbing such potential stresses may be unnecessary or undesirable. In such applications, a connector with little, if any, ability to absorb such stresses can be employed.

Figure 10:
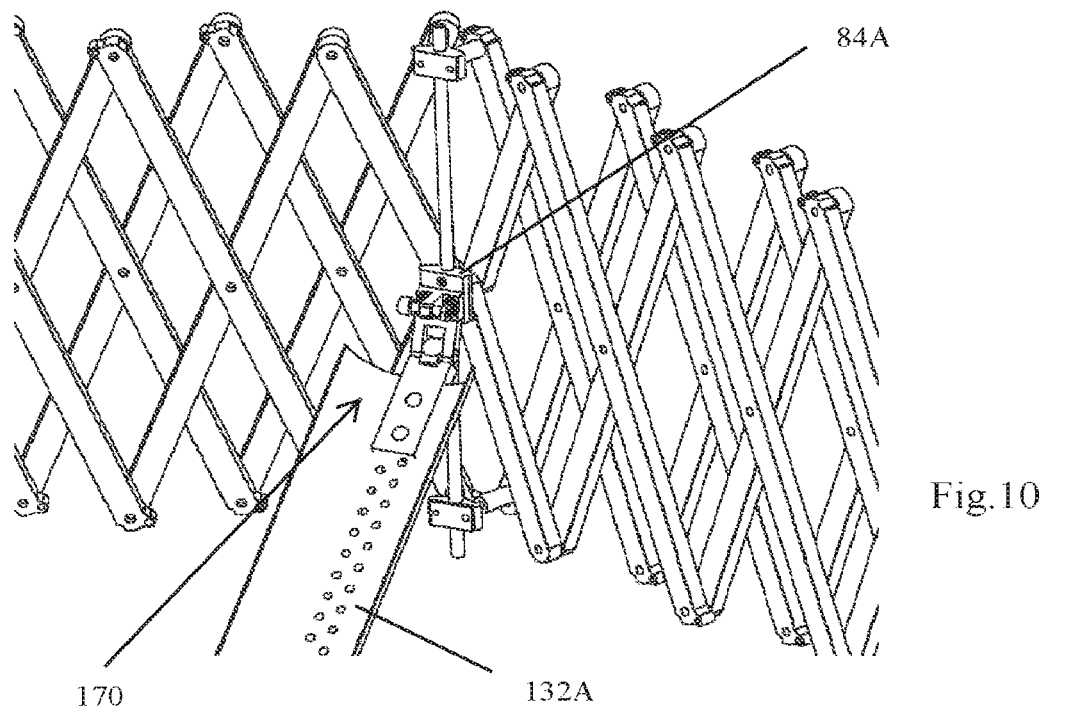
FIG. 10 illustrates a connector structure for connecting a tape to the endless pantograph illustrated in FIG. 6.

With reference to FIGS. 1D-1F and 12-14, the tape dispensing structure 54 includes four motorized tape cassettes 130A-130D that respectively support "carpenter" tapes 132A-132D. Each of the tapes 132A-132D has an end that is operatively connected to or wrapped about a spindle of the motorized tape cassette 130A-130D with which the tape is associated. With reference to FIG. 10, the other end of each of the tapes 132A-132D is operatively connected to one of the vertex structures 82 of the endless pantograph 52. When the tapes 132A-132D are in the undeployed state, a substantial portion of each of the tapes is wound around the spindle. When the tapes 132A-132C are in the deployed state, a substantial portion of each of the tapes linearly extends between the motorized tape cassette and the deployed endless pantograph 52 (e.g., FIG. 1F). Each of the tapes 132A-132D is a quasi-dual stable tape that exhibits: (a) a first stable state when the entire tape is wound or rolled, (b) a second stable state when the entire tape is straight, and (c) a propensity to transition towards the second stable state when a portion of the tape is in the first state and another portion of the tape is in the second state. As such, when each of the tapes 132A-132D is in the undeployed state in which a substantial portion of the tape is wound around a spindle and a portion of the tape is straight, each of the tapes is storing potential energy that can be used to facilitate the transition of the tape from undeployed state to the deployed state in which a substantially portion of the tape linearly extends between the motorized tape cassette and the deployed endless pantograph 52. The tapes 132A-132D have different lengths. As such, when the tapes 132A-132D are in the deployed state (e.g., FIG. 1F), the feed antenna 24 and the deployed, flexible reflectarray 26 are in an offset feed configuration in which the boresight of the feed antenna 24 is not parallel to a line perpendicular to the deployed, flexible reflectarray 26. In the illustrated embodiment, the tape 132A is longer than tapes 132B-132D, tapes 132B, 132C are of substantially the same length, and tape 132D is shorter than tapes 132A-132C.

Figure 12:
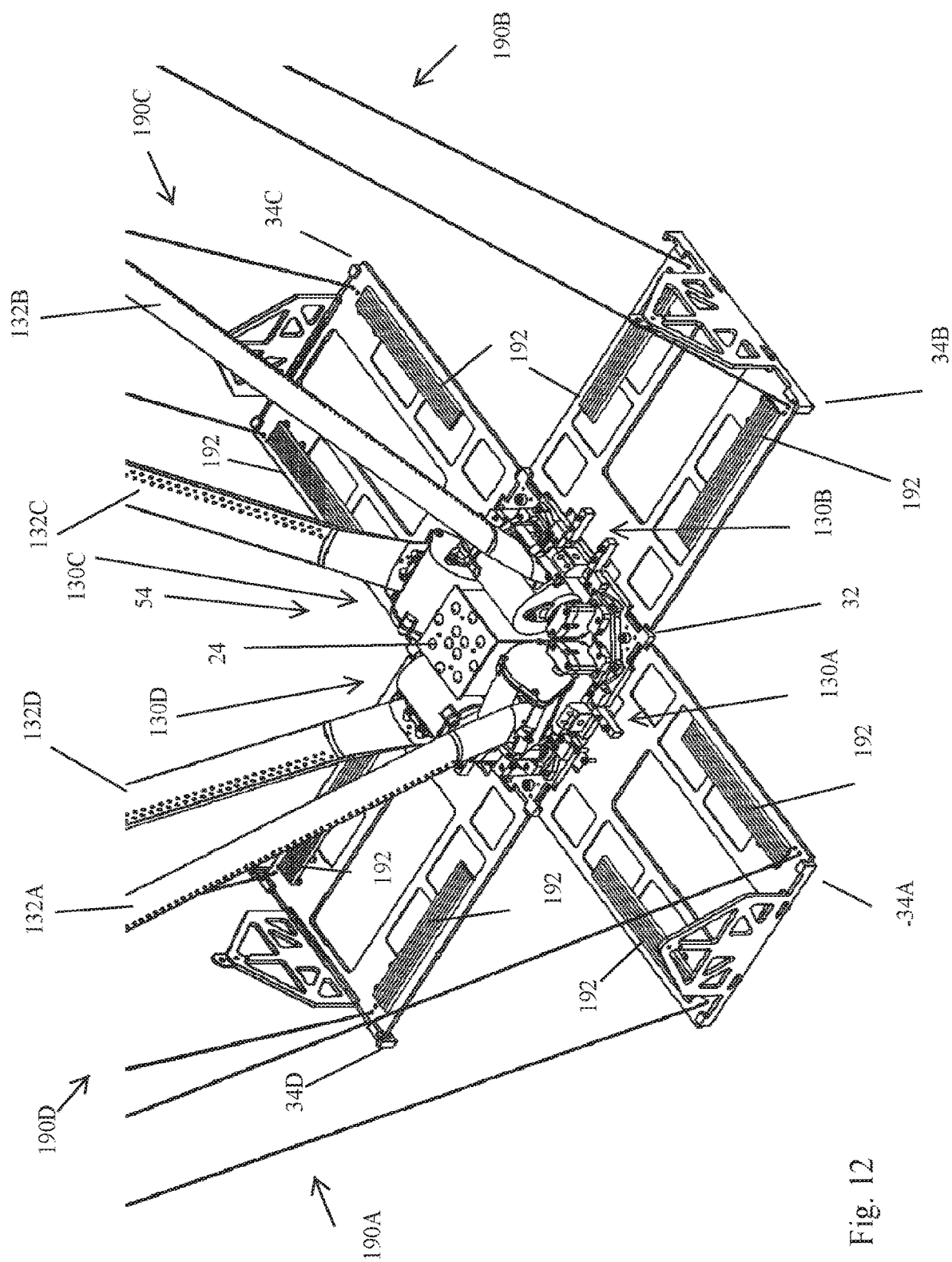
FIG. 12 illustrates the motorized tape cassettes and feed antenna associated with the base of the deployment structure shown in FIGS. 1A-1F.
Figure 13:
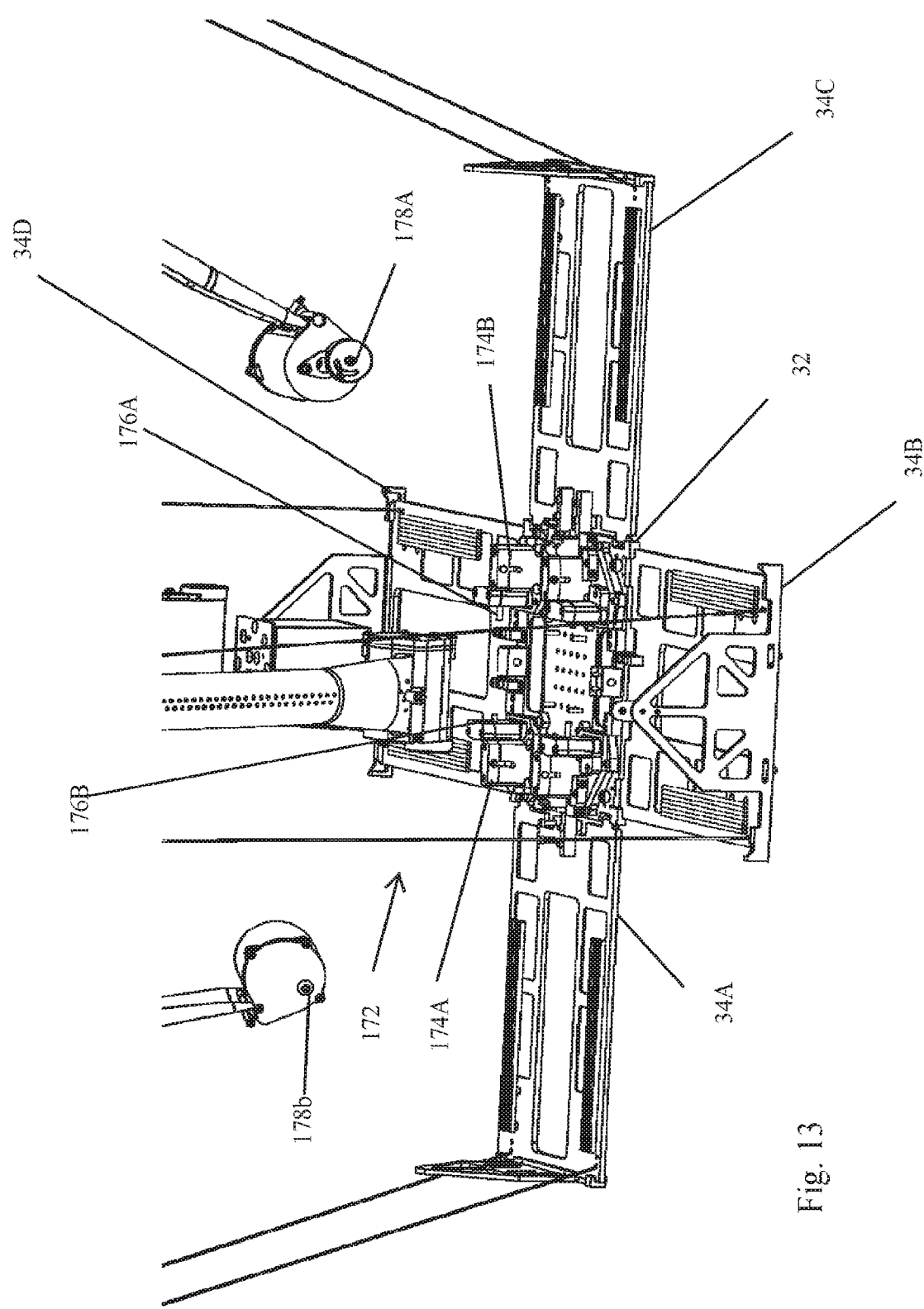
FIG. 13 is an exploded view of the motorized tape cassettes, feed antenna, and base of the deployment structure shown in FIGS. 1A-1F.
Figure 14:
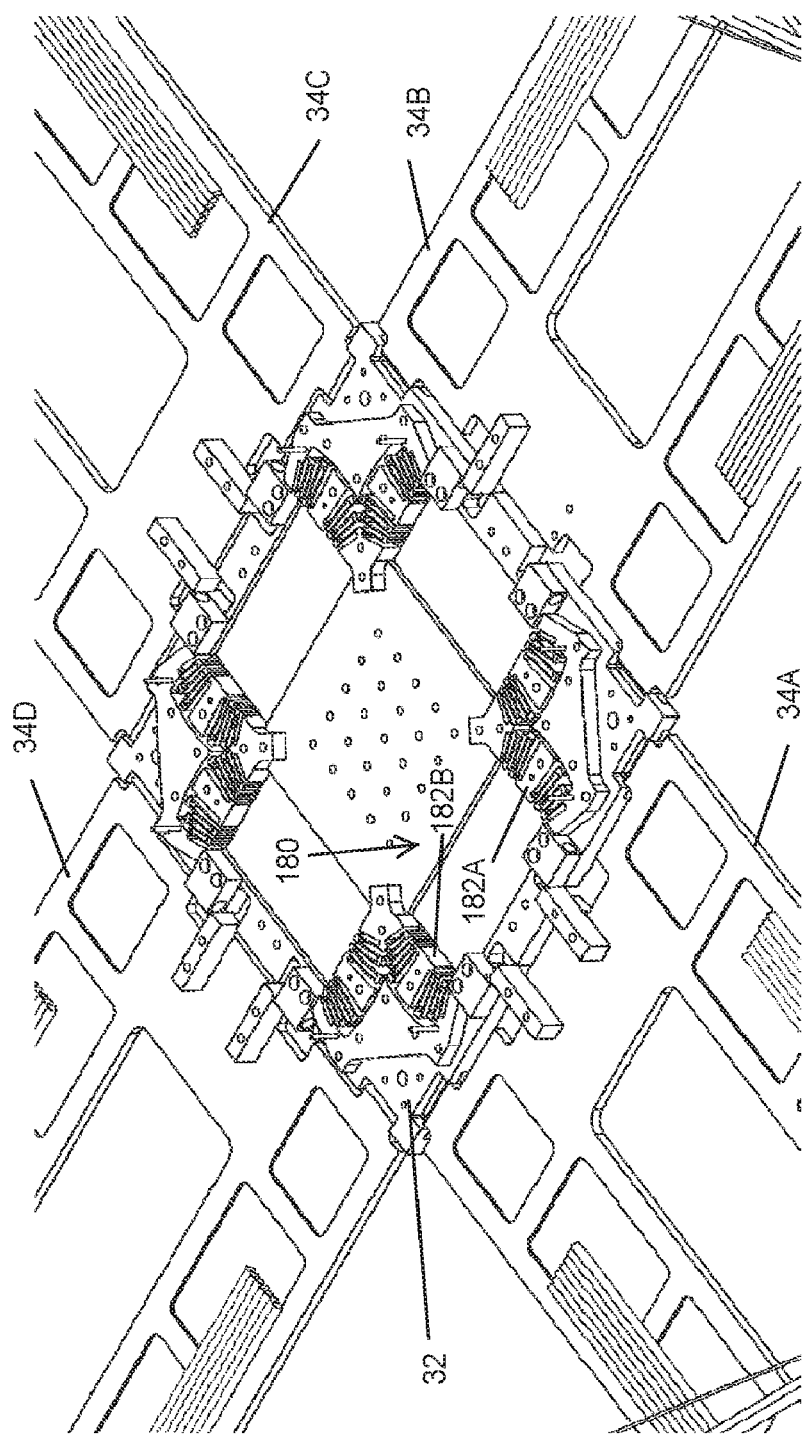
FIG. 14 illustrates the base of the deployment structure in FIGS. 1A-1F and the pairs of serpentine flexures that facilitate rotation of the each of the motorized tape cassettes about an axis that is perpendicular to the base.

With continuing reference to FIGS. 1D-1F and 12-14, the tapes 132A-132D are employed during deployment to move the endless pantograph 52 away from the feed antenna 24. As such, the angle of each of the tapes 132A-132D relative to the endless pantograph 52 changes during deployment. With reference to FIG. 10, to accommodate this change in the angle, the end of tape 132A is attached to the endless pantograph 52 and, more specifically, to the housing 84A by a hinge joint 170. The other tapes 132B-132D are also attached to the endless pantograph 52 by hinge joints. The opposite ends of each of the tapes 132A-132D also accommodate this change in angle. With reference to FIGS. 12 and 13, each of the motorized tape cassettes 130A-130D is attached to the base 32 of the canister 22 by a mounting structure 172. The mounting structure 172 includes a pair of mounting standards 174A, 174B that are operatively attached to the base 32. The mounting standards 174A, 174B support a motorized tape cassette such that the cassette can rotate about an axis that accommodates the noted change in angle of the associated tape during deployment. In the illustrated embodiment, the mounting standard 174A includes a mounting pin 176A that is established in a first hole 178A associated with the motorized tape cassette and the mounting standard 174B includes a mounting pin 176B that engages a second hole 178B associated the motorized tape cassette. The pins 174A, 174B and the mounting holes 178A, 178B are collinear and define an axis about which the motorized tape cassette can rotate during deployment of the associated tape.

In certain embodiments and in certain situations, the deployment of the tapes may produce a twist, i.e., a rotation of the endless pantograph 52 and flexible reflectarray 26 about an axis that is perpendicular to the base 32. To accommodate such a twist and prevent undue stress from being placed on the tapes, the mounting structure 172 associated with each of the motorized tape cassettes 130A-130D includes a rotation structure 180 that allows the associated motorized tape cassette to rotate about an axis that is perpendicular to the base 32. In the illustrated embodiment and with reference to FIGS. 13 and 14, the rotation structure 180 comprises a pair of serpentine flexures 182A, 182B to which the mounting standards 174A, 174B are attached. The pair of serpentine flexures 182A, 182B also accommodate some translation movement but are biased to facilitate rotation of the associated motorized tape cassette about an axis perpendicular to the base 32.

An embodiment of a tape dispensing structure in which three tapes are employed, rather than four tapes, is feasible. Further, an embodiment in which more than four tapes is employed is also feasible. Also feasible in certain embodiment are other types of extendable structures, such as telescoping rods, tapes that are folded in a serpentine fashion when in an undeployed state and extend linearly in a deployed state, spring-loaded structures characterized by rods or beams with a spring structure extending between the rods or beams that allows the rods or beams to be folded when undeployed and to adopt an extended structure when deployed, to name a few.

Associated with the deployment mechanism 28 are four pairs of lanyards 190A-190D with each pair of lanyards operatively attached to the same vertex structure 82 to which one of the tapes 132A-132D is attached. The four pairs of lanyards 190A-190D respectively cooperate with the four tapes 132A-132D to form four truss-like structures that enhance the stability of the deployed endless pantograph 52 and deployed flexible reflectarray 26. In the undeployed state, each lanyard is stored in lanyard storage device 192 that, in the illustrated embodiment, comprises a group of tubes disposed in a parallel manner. In the undeployed state, the group of tubes store a lanyard such that the lanyard follows a serpentine path. During deployment, each of the lanyards is extracted from its lanyard storage device 192 as the tapes 132A-132D are dispensed by the motorized tape cassettes 130A-130D.

With reference to FIGS. 1A-1F, the transition of the deployable structure 20 between the undeployed and deployed states is described. With reference to FIG. 1A, the deployable structure 20 is in the undeployed state. Deployment commences with an electrical current being applied to the meltable pin associated with the releasable latch structure 36 to release the latch and allow the spring-loaded doors 34A-34D to deploy, as shown in FIG. 1B. At this point, the doors 34A-34D are no longer constraining the endless pantograph 52 or the tapes 132A-132D. The spring structures associated with the endless pantograph 52 endeavor to deploy the endless pantograph 52. However, the motorized tapes cassettes 130A-130D allow the operation of the spring structures to be controlled or damped. In any event, the endless pantograph 52 and the flexible reflectarray 26 begin to deploy and the tapes 132A-132D begin to dispense so as to move the endless pantograph 52 and the flexible reflectarray 26 away from the feed antenna 24, as shown in FIGS. 1D-1F. The deployment of the endless pantograph 52 and the flexible reflectarray 26 continues until further deployment of the endless pantograph 52 is prevented by the limit structure associated with the endless pantograph 52, which is the plurality of pins in the illustrated embodiment. At this point, the flexible reflectarray 26 is a substantially flat or planar and constitutes an operable reflectarray. The deployment of the tapes 132A-132D continues until each of the tapes 132A-132D has reached a predetermined length. If the flexible reflectarray 26 is fully deployed at this point, the tapes 132A-132D have positioned the flexible reflectarray 26 relative to the feed antenna 24 so as to operatively position the reflectarray and the feed antenna for use in a reflectarray antenna with an offset feed, as shown in FIG. 1F.

Figure 11:
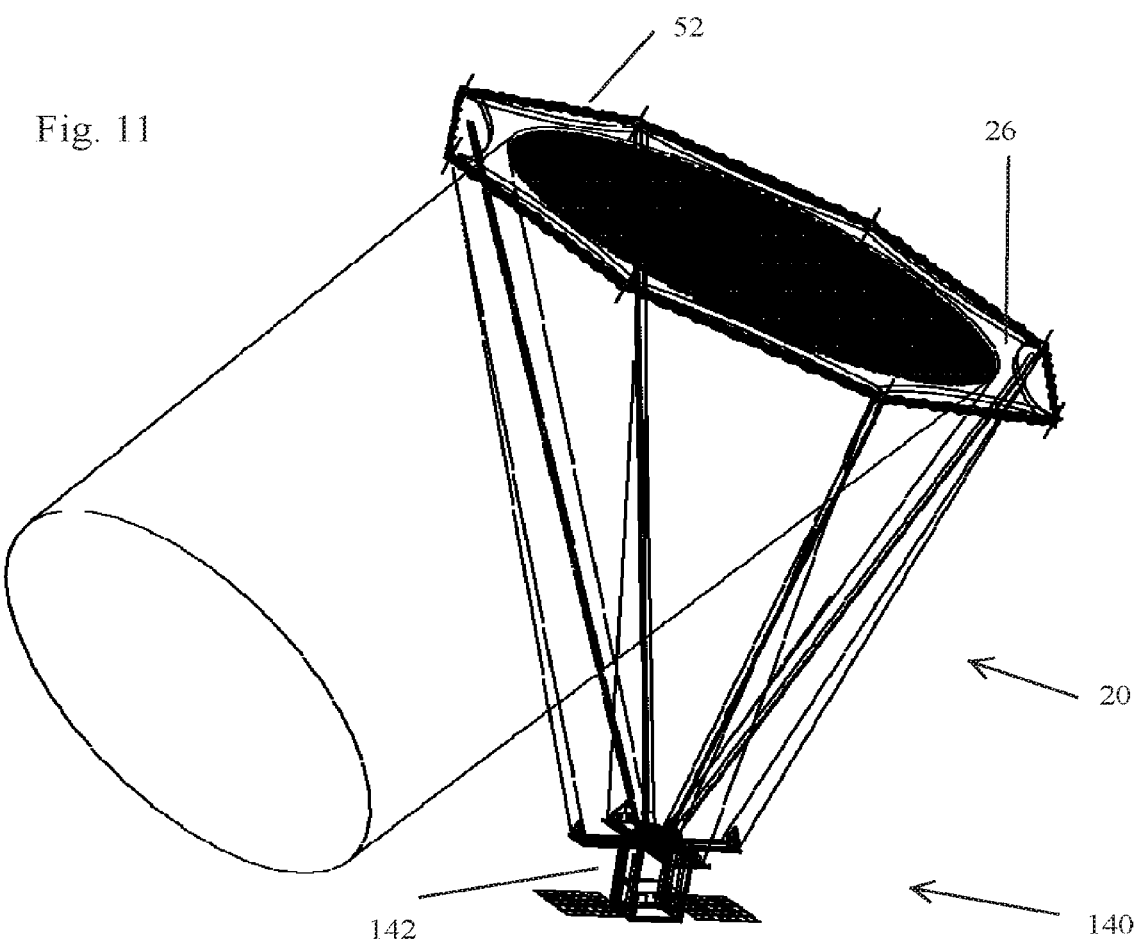
FIG. 11 illustrates a satellite that includes the deployable structure illustrated in FIGS. 1A-1F and with the flexible reflectarray in the deployed state.

With reference to FIG. 11, a satellite 140 that includes the deployable structure 20 and other satellite elements 142. The deployable structure 20 operates such that upon full deployment, the feed antenna 24 is positioned between the deployed, flexible reflectarray 26 and the other satellite elements 142.

In certain embodiments, the potential energy stored in undeployed tapes may provide sufficient radial force to deploy the endless pantograph and thereby eliminate the need for any spring structure/structures associated with the endless pantograph. The operation of such tapes may or may not be supplemented by the use of one or more electric motors. If supplemented by one or more electric motors, one function of the motor(s) would be to control or dampen the deployment of the tapes. In yet other embodiments, extendable structures other than tapes can be employed. For instance, telescoping rods and other extendable structure can be employed. Further, other extendable structures that employ other motive forces, such as pneumatic or hydraulic forces, can be employed. It should also be appreciated that the endless pantograph structure is not limited to deploying a flexible reflectarray. The endless pantograph can be used to deploy other flexible structures in space-based applications, such flexible solar panels, solar sails, and the like. It should also be appreciated that the endless pantograph can be used to deploy flexible membrane structure other than a flexible reflectarray. For instance, the endless pantograph structure can be used to deploy a flexible solar cell array or solar sail. Further, while the deployment structure has largely been described with respect to its use in implementing an offset reflectarray antenna, the deployment structure is believed to be adaptable to the implementation of other reflectarray antenna structures, such as center fed reflectarray antennas, center fed Cassegrain reflectarray antennas, and offset fed Cassegrain reflectarray antennas, to name a few.

The foregoing description of the invention is intended to explain the best mode known of practicing the invention and to enable others skilled in the art to utilize the invention in various embodiments and with the various modifications required by their particular applications or uses of the invention.

What is claimed is:

1. A deployable antenna structure configured to deploy from an undeployed state to a deployed state, comprising:
    a flexible electrical element including at least one antenna membrane on the flexible electrical element;
    a plurality of tapes dispensable from a rolled format in the undeployed state to a linear format in the deployed state;
    an enclosing structure including a base; and
    a plurality of tape dispensers operatively coupled to the base, the plurality of tape dispensers being adapted to transition the flexible electrical element from the undeployed state towards the deployed state,
    wherein each of the plurality of tapes is operatively coupled at a first end to the flexible electrical element and at a second end to one of the plurality of tape dispensers, and
    wherein the flexible electrical element is folded in the enclosing structure in the undeployed state and is unfolded in the deployed state to form a substantially flat antenna membrane surface, the flexible electrical element extended away from the base by the plurality of tapes when deploying to the deployed state.

2. The deployable antenna structure of claim 1, wherein the plurality of tapes creates distance between the flexible electrical element and the base when deploying.

3. The deployable antenna structure of claim 1, wherein at least one tape from the plurality of tape dispensers is dispensed at a different length as compared to others of the plurality of tapes.

4. The deployable antenna structure of claim 3, wherein the plurality of tape dispensers dispense at least two tapes to a same length.

5. The deployable antenna structure of claim 1, wherein, in the deployed state, the second end of each tape is operatively coupled to the flexible electrical element substantially axisymmetrically about a center of the flexible electrical element.

6. The deployable antenna structure of claim 1, wherein the plurality of tapes dispense from one side of the base but dispense in different directions.

7. The deployable antenna structure of claim 1, wherein the each of the plurality of tapes diverge from one another in at least two dimensions when dispensed.

8. The deployable antenna structure of claim 1, wherein at least one tape of the plurality of tapes is dispensed to a predetermined length.

9. The deployable antenna structure of claim 1, further comprising a pantograph structure, the pantograph structure operatively coupled to the flexible electrical element about a perimeter of the flexible electrical element, the pantograph structure operatively coupled to the plurality of tapes at the first end.

10. The deployable antenna structure of claim 1, wherein the plurality of tape dispensers are coupled to the base at positions substantially axisymmetrical about a center of the base.

11. The deployable antenna structure of claim 1, wherein each tape dispenser of the plurality of tape dispensers comprises:
    a tape dispensing cassette having a rotational axis about which one of the plurality of tapes is coiled; and
    a mounting standard coupled to the base,
    wherein the tape dispensing cassette is coupled to the mounting standard to allow the tape dispensing cassette to rotate about the rotational axis.

12. The deployable antenna structure of claim 1, wherein each of the plurality of tape dispensers comprises a mounting standard coupled to the base, wherein the mounting standard is coupled to the base by one or more flexures, the one or more flexures adapted to facilitate rotation of the each of the plurality of tape dispensers about an axis that is substantially perpendicular to the base.

13. The deployable antenna structure of claim 1, further comprising:
    a plurality of doors coupled to the base at edges of the base,
    wherein the plurality of doors and the base form the enclosing structure in the undeployed state, and wherein the plurality of doors folds down during deployment to provide a rigid structure relative to the base when in the deployed state.

14. The deployable antenna structure of claim 13, further comprising one or more lanyards, wherein each tape of the plurality of tapes is operatively coupled to one or more lanyards at the first end, each of the one or more lanyards operatively coupled to no more than one tape of the plurality of tapes, each of the one or more lanyards also coupled to one or more of the base and a door.

15. The deployable antenna structure of claim 14, wherein, in the deployed state, each tape of the plurality of tapes forms a truss like structure with the one or more lanyards.

16. The deployable antenna structure of claim 14, the one or more lanyards are coupled to one or more of the base and a door substantially axisymmetrically about a center of the base.

17. The deployable antenna structure of claim 1, wherein each of the plurality of tapes is a quasi-dual stable tape that exhibits a first stable state when wound, a second stable state when straight, and a propensity towards the second stable state when a portion of the each of the plurality of tapes is in the first stable state and another portion of the each of the plurality of tapes is in the second stable state.

18. The deployable antenna structure of claim 1, wherein, when in the deployed state, the flexible electrical element defines a polygon-like shape that has catenary-shaped edges.

19. The deployable antenna structure of claim 1, further comprising a feed antenna coupled to the base.

20. The deployable antenna structure of claim 1, further comprising electric motors, wherein the electric motors are configured to engage the plurality of tapes to dampen deployment of the plurality of tapes.

21. The deployable antenna structure of claim 1, wherein the enclosing structure is configured to obstruct extension of the plurality of tapes in the linear format from the enclosing structure in the undeployed state.

22. The deployable antenna structure of claim 21, wherein the enclosing structure is configured to obstruct the unfolding of the flexible electrical element from the enclosing structure in the undeployed state.

23. The deployable antenna structure of claim 1, wherein the flexible electrical element is extended away from the base by the plurality of tapes substantially perpendicularly to the base.

* * * * *